(12) United States Patent
Maruyama et al.

(10) Patent No.: US 9,808,023 B2
(45) Date of Patent: Nov. 7, 2017

(54) PROCESS FOR PRODUCING PURIFIED TEA EXTRACT

(75) Inventors: Eizo Maruyama, Kamisu (JP); Yukiteru Sugiyama, Kamisu (JP); Kenichi Shikata, Kamisu (JP); Keiji Shibata, Kamisu (JP); Hideaki Ueoka, Kamisu (JP)

(73) Assignee: Kao Corporation, Tokyo (JP)

( * ) Notice: Subject to any disclaimer, the term of this patent is extended or adjusted under 35 U.S.C. 154(b) by 1542 days.

(21) Appl. No.: 12/281,402

(22) PCT Filed: Mar. 1, 2007

(86) PCT No.: PCT/JP2007/000156
§ 371 (c)(1),
(2), (4) Date: Sep. 2, 2008

(87) PCT Pub. No.: WO2007/099715
PCT Pub. Date: Sep. 7, 2007

(65) Prior Publication Data
US 2009/0041921 A1 Feb. 12, 2009

(30) Foreign Application Priority Data

| Mar. 2, 2006 | (JP) | 2006-056350 |
| Apr. 4, 2006 | (JP) | 2006-102942 |
| Aug. 31, 2006 | (JP) | 2006-234992 |
| Dec. 7, 2006 | (JP) | 2006-330934 |

(51) Int. Cl.
*A23F 3/20* (2006.01)

(52) U.S. Cl.
CPC .............. *A23F 3/20* (2013.01); *A23F 3/205* (2013.01)

(58) Field of Classification Search
USPC ...................................................... 426/665
See application file for complete search history.

(56) References Cited

U.S. PATENT DOCUMENTS

| 4,051,264 | A | | 9/1977 | Sanderson et al. | |
| 4,613,672 | A | * | 9/1986 | Hara | 549/399 |
| 4,673,530 | A | | 6/1987 | Hara | |
| 5,318,986 | A | | 6/1994 | Hara et al. | |
| 5,820,901 | A | * | 10/1998 | Nicolas et al. | 426/49 |
| 5,925,389 | A | * | 7/1999 | Lehmberg et al. | 426/50 |
| 7,012,149 | B2 | * | 3/2006 | Burdick et al. | 549/399 |
| 2003/0082273 | A1 | | 5/2003 | Iwasaki et al. | |
| 2003/0083270 | A1 | | 5/2003 | Burdick et al. | |
| 2003/0096050 | A1 | | 5/2003 | Inaoka et al. | |
| 2005/0062597 | A1 | | 3/2005 | Su | |
| 2006/0057261 | A1 | | 3/2006 | Ogura et al. | |
| 2006/0069046 | A1 | | 3/2006 | Burdick et al. | |

FOREIGN PATENT DOCUMENTS

| CN | 1708238 A | 12/2005 |
| CN | 1711866 A | 12/2005 |
| EP | 1297757 A1 | 4/2003 |
| JP | 59 219384 | 12/1984 |
| JP | 1 289447 | 11/1989 |
| JP | 3 133928 | 6/1991 |
| JP | 5 153910 | 6/1993 |
| JP | 8 109178 | 4/1996 |
| JP | 2001 97968 | 4/2001 |
| JP | 2001 299887 | 10/2001 |
| JP | 2002 335911 | 11/2002 |
| JP | 2003-169641 A | 6/2003 |
| JP | 2004 222719 | 8/2004 |
| JP | 2004 321105 | 11/2004 |
| JP | 2005-058208 | 3/2005 |
| JP | 2005-75349 | 3/2005 |
| JP | 2005 170871 | 6/2005 |
| JP | 2006 8580 | 1/2006 |
| JP | 2006 36645 | 2/2006 |

OTHER PUBLICATIONS

U.S. Appl. No. 12/676,281, filed Mar. 3, 2010, Maruyama, et al.
Chinese Office Action issued Jul. 26, 2011, in Patent Application No. 200780007589.6 (with English-language translation).
Dong Xinxin, "Separation condition of cetechins with adsorption chromatograpy and its application to expanded bed", Chinese Selected Doctal Dissertations and Master's Theses Full-Text Databases—Engineering and Science, vol. 1, No. 3, Sep. 15, 2003, pp. 33-34.
Dong Xinxin, "Separation condition of catechins with adsorption chromatograpy and its application to expanded bed", Chinese Selected Doctoral Dissertations and Master's Theses Full-Text Databases—Engineering and Science, vol. 1, No. 3, Sep. 15, 2003, pp. 33-34 (Reference previously filed submitting English translation only).

* cited by examiner

*Primary Examiner* — Tamra L Dicus
(74) *Attorney, Agent, or Firm* — Oblon, McClelland, Maier & Neustadt, L.L.P.

(57) ABSTRACT

Provided is a process for producing a tea extract having a high recovery rate of non-polymer catechins, a low caffeine content and an improved taste and color tone. As one embodiment of this invention provides, there is provided a process for producing a purified tea extract by adsorbing a tea extract on a synthetic adsorbent, bringing an aqueous solution of an organic solvent or a basic aqueous solution into contact with the synthetic adsorbent to elute non-polymer catechins, and then bringing the eluate into contact with activated carbon in an aqueous solution of an organic solvent.

12 Claims, No Drawings

PROCESS FOR PRODUCING PURIFIED TEA EXTRACT

FIELD OF THE INVENTION

The present invention relates to a process for producing a purified product of a tea extract.

BACKGROUND OF THE INVENTION

Catechin is reported to possess an α-amylase-activity-inhibiting effect as one of its properties (see, for example, Patent Document 1). In order for such a physiological effect to materialize, catechin needs to be ingested in large amounts, so there has been a strong demand for a technology making it possible to obtain a beverage containing catechin in high concentration.

As one example among such technologies, there is a method characterized in that catechin is added in a dissolved form to a beverage by making use of a tea extract (e.g., the concentrate of a green tea extract), However, this method is known to impair the quality of a beverage, depending on the kind of a beverage to which catechin is to be added in high concentration. For example, a tea-based beverage or a non-tea-based beverage (e.g., a carbonated beverage) is susceptible to the residual bitterness and astringency intrinsic to caffeine and green tea, thus causing its commercial value to be considerably damaged.

Adsorption methods (Patent Documents 2 to 4), extraction methods (Patent Documents 5 to 6) and the like are known for removing impurities, like caffeine, from a tea extract.

In these methods, an organic solvent may be used if it is desired to increase the content of non-polymer catechins in a tea extract, but this is problematic because the recovery rate is poor from the industrial viewpoint.

As a method for improving the color tone of a tea extract, it is known to use an antibacterial deodorant obtained by causing activated carbon to act on the tea extract in the presence of a cyclodextrin to adsorb color components on the activated carbon for their elimination (Patent Document 7). This method, however, is difficult to use in the case of a catechin preparation required for drinking.

It is known that the flavor and taste of a green tea extract can be improved by controlling the percentage of non-gallates in non-polymer catechins (see Patent Document 8). In addition, as disclosed in Patent Document 9, it is possible to reduce the amount of the gallate catechin responsible for bitterness, by a method that applies tannase treatment to gallate catechins and converts a part or the entire part of them into gallic acid to obtain a mixture of catechins and gallic acid. However, this method is meant to control the percentage of non-gallates by conducting tannase treatment, so that the obtained flavor or taste was not satisfactory due to the remaining enzyme (tannase) and the formation of gallic acid through hydrolysis of the gallates.

An efficient technology already exists for the production of a tea extract with gallates contained at a high percentage (see Patent Document 10), but there is no efficient technology known for the production of a tea extract containing non-gallates at a high percentage. On the other hand, there is a technology known for treating a tea extract with a synthetic adsorbent and collects unadsorbed components (see Patent Document 11). This technology is nonetheless not suited for applications such as a beverage, because of the residual flavor and taste intrinsic to tea as well as its strong bitterness.

There is yet another technology known for loading a green tea extract on a column packed with a synthetic adsorbent to effect adsorption and then allowing it to be desorbed with two aqueous ethanol solutions of different concentrations (see Patent Document 12). This technology is meant to remove caffeine and impurities while maintaining the catechin composition through the treatment, so the improvement effect on flavor and taste attributable to the percentage of non-gallates is marginal.

Patent Document 1: JP-A-03-133928
Patent Document 2: JP-A-05-153910
Patent Document 3: JP-A-08-109178
Patent Document 4: JP-A-2002-335911
Patent Document 5: JP-A-01-289447
Patent Document 6: JP-A-59-219384
Patent Document 7: JP-A-2001-299887
Patent Document 8: JP-A-2004-321105
Patent Document 9: JP-A-2004-222719
Patent Document 10: JP-A-2006-036645
Patent Document 11: JP-A-2005-170871
Patent Document 12: JP-A-2006-008580

SUMMARY OF THE INVENTION

The present invention provides (1) a process for producing a purified tea extract, which includes adsorbing a tea extract on a synthetic adsorbent, bringing a basic aqueous solution or an aqueous solution of an organic solvent into contact with the synthetic adsorbent to elute non-polymer catechins, and then bringing the eluate into contact with activated carbon in an aqueous solution of an organic solvent.

The present invention also provides (2) a process for producing a purified tea extract, which includes adsorbing a tea extract on a synthetic adsorbent, bringing a basic aqueous solution or an aqueous solution of an organic solvent into contact with the synthetic adsorbent to elute non-polymer catechins, adjusting the pH of the eluate to 7 or lower, concentrating the eluate, and then subjecting the eluate to solid-liquid separation to remove precipitated and suspended matters.

The present invention further provides (3) a process for producing a purified tea extract, which includes adsorbing a tea extract on a synthetic adsorbent, bringing a washing solution into contact with the synthetic adsorbent, and then bringing an aqueous solution of an organic solvent or a basic aqueous solution into contact with the synthetic adsorbent to fractionate a tea extract having a percentage of non-gallates as non-polymer catechins in a range of from 55 to 100% and a caffeine/non-polymer catechins of not greater than 0.15.

The present invention further provides (4) a process for producing a purified tea extract, which includes hydrolyzing a tea extract, adsorbing the tea extract on a synthetic adsorbent, and then bringing a basic aqueous solution or an aqueous solution of an organic solvent into contact with the synthetic adsorbent to elute non-polymer catechins, The present invention further provides a purified tea extract, wherein a percentage of non-polymer catechins in a solid content is from 25 to 95 wt %, a percentage of gallates in the non-polymer catechins is from 0 to 70 wt %, a ratio of gallic acid to the non-polymer catechins is from 0 to 0.1, and a ratio of caffeine to the non-polymer catechins is from 0 to 0.15.

The present invention further provides a purified tea extract, wherein a percentage of non-polymer catechins in a solid content is from 25 to 95 wt %, a percentage of gallates in the non-polymer catechins is from 0 to 70 wt %, a ratio of gallic acid to the non-polymer catechins is from 0 to 0.1, a ratio of caffeine to the non-polymer catechins is from 0 to 0.2, and a color tone is from 0 to 0.8 at 450 nm when the purified tea extract is formed into an aqueous solution having a 1 wt % concentration of the non-polymer catechins.

The present invention further provides a purified tea extract, wherein a percentage of non-polymer catechins in a solid content is from 45 to 90 wt %, a percentage of gallates in the non-polymer catechins is from 0.001 to 47 wt %, and a gallic acid amount/non-polymer catechins weight ratio is not greater than 0.3.

The present invention further provides a purified tea extract obtained by the production process (1) to (4).

The present invention further provides a packaged tea beverage with a purified tea extract obtained by the production process (1) to (4) and added therein.

MODES FOR CARRYING OUT THE INVENTION

The present invention is to provide a process for producing a purified tea extract having a high recovery rate of non-polymer catechins, a low caffeine content and a good taste and color tone. The present invention is also to provide, with the purified tea extract, a beverage having good stability.

The present inventors have found that the selective elution of non-polymer catechins with an aqueous solution of an organic solvent or a basic aqueous solution subsequent to adsorption of a tea extract on a synthetic adsorbent makes it possible to recover non-polymer catechins in a high yield, to lower the content of caffeine and to obtain a purified product improved in taste and color tone.

By the present invention, it is possible to obtain a purified tea extract having a high recovery rate of non-polymer catechins, a low caffeine content and an improved taste and color tone. With the purified tea extract according to the present invention, a beverage having good stability can be obtained.

The term "non-polymer catechins" as used herein is a generic term, which collectively encompasses non-epicatechins such as catechin, gallocatechins, catechingallates and gallocatechingallates, and epicatechins such as epicatechins, epigallocatechins, epicatechingallates and epigallocatechingallates.

The term "non-polymer non-gallatecatechins" as used herein is a generic term, which collectively encompasses catechin, gallocatechins, epicatechins, epigallocatechins and the like. The term "the percentage of non-gallatecatechins in non-polymer catechins" means the weight percentage of the non-polymer non-gallatecatechins based on the total amount of the non-polymer catechins.

The term "non-polymer gallocatechins" as used therein is a generic term, which collectively encompasses gallocatechins, gallocatechingallates, epigallocatechins, epigallocatechingallates and the like. The term "the percentage of gallocatechins in non-polymer catechins" means the weight percentage of the non-polymer gallocatechins in the non-polymer catechins.

The term "non-polymer epicatechins" as used herein is a generic term, which collectively encompasses epicatechin, epigallocatechins, epicatechingallates, epigallocatechingallates and the like. The term "the percentage of epicatechins in non-polymer catechins" means the weight percentage of the above-described non-polymer epicatechins based on the total amount of the non-polymer catechins.

The term "non-polymer gallatecatechins" as used herein is a generic term, which collectively embraces catechingallates, gallocatechingallates, epicatechingallates, epigallocatechingallates and the like. The term "the percentage of gallatecatechins in non-polymer catechins" means the weight percentage of the above-described non-polymer gallatecatechins based on the total amount of the non-polymer catechins.

As tea extracts usable in the present invention, extracts obtained from tea leaves can be mentioned. In addition, mixtures of caffeine-containing extracts derived from other caffeine-containing plants such as, for example, coffees with tea extracts are also usable. Usable tea leaves, more specifically, include tea leaves prepared from tea leaves of the Genus *Camellia*, for example, *C. sinensis*, *C. assamica* and the Yabukita variety, or their hybrids. Such prepared tea leaves include green teas such as sencha (middle-grade green tea), bancha (coarse green tea), gyokuro (shaded green tea), tencha (powdered tea) and kamairicha (roasted tea) semi-fermented teas represented by oolong tea, and fermented teas such as black tea. It is also possible to use tea leaves subjected to treatment in contact with carbon dioxide in its supercritical state.

As a method for extracting tea, the extraction can be conducted by a conventional method such as stirring extraction or drip extraction. An organic acid or organic acid salt, such as sodium ascorbate, can be added beforehand to water upon extraction. It is also possible to make combined use of boiling deaeration or an extraction method which is conducted while bubbling an inert gas such as nitrogen gas to eliminate dissolved oxygen, that is, under the so-called non-oxidizing atmosphere. The extract obtained as described above can be used in the present invention as it is or after it is dried or concentrated. Exemplary forms of the tea extract include liquid, slurry, semi-solid and solid forms.

Instead of employing, as a tea extract for use in the present invention, an extract obtained from tea leaves, it is also possible to employ a concentrate of a tea extract in a form dissolved in or diluted with water or an organic solvent or to employ an extract from tea leaves and a concentrate of a tea extract in combination.

The term "a concentrate of a tea extract" as used herein means a concentrate of an extract obtained from tea leaves with hot water or an aqueous solution of an organic solvent, and means, for example, those prepared by the processes disclosed in JP-A-59-219384, JP-A-04-020589, JP-A-05-260907, JP-A-05-306279 and the like. Specifically, it is possible to use, as a solid catechin extract, a commercially-available crude catechin preparation such as "POLYPHENON" (product of Tokyo Food Techno Co., Ltd.), "TEAFURAN" (product of ITO EN, LTD.) or "SUNPHENON" (product of Taiyo Kagaku Co., Ltd.).

The tea extract for use in the purification treatment according to the present invention may preferably be subjected to hydrolysis treatment to reduce bitterness. By the hydrolysis treatment, the percentage of gallates in the non-polymer catechins drops. In the present invention, it is more preferred for the production process (4) to conduct the hydrolysis step. The reduction in the concentration of non-polymer gallocatechins in the non-polymer catechins by the hydrolysis may be preferably 5 wt % or higher, more preferably 7 wt % or higher, still more preferably 10 wt % or higher, from the standpoint of taste improvements. As the manner of hydrolysis, it can be conducted by treatment with an enzyme, acid treatment, alkali treatment, or the like. The enzyme may preferably be an enzyme, cells or culture having tannase activity, the acid may preferably be hydrochloric acid, sulfuric acid or phosphoric acid, and the alkali may preferably be caustic soda. Among these, hydrolysis with an enzyme is preferred from the standpoint of reaction control. The term "having tannase activity" as used herein means that they have activities able to degrade tannin, and any desired enzyme, cells or culture. These substances can be used as long as such activities e prove to exist therein.

Described specifically, among products commercially available as enzymes having tannase activity, "PECTINASE PL AMANO" (product of Amano Enzyme Inc.), "HEMISELLULASE AMANO 90" (product of Amano Enzyme Inc.), "TANNASE KTFH" (product of Kikkoman Corporation) and the like can be used. Of these, tannase is preferred. Tannase obtain able by culturing, for example, a tannase-producing fungus of the *Aspergillus, Penicillium* or *Rhizopus* genus can be mentioned. More preferred is tannase available from *Aspergillus oryzae*.

The term "cells having tannase activity" means cells that can produce an enzyme having tannase activity, and can include koji fungi. For example, those of the *Aspergillus, Penicillium* or like genus can be mentioned, with *Aspergillus oryzae* being preferred.

The term "a culture having tannase activity" means a cultured obtain able by culturing a tannase-producing fungus of the *Aspergillus, Penicillium* or *Rhizopus* genus. Preferably, a culture obtain able by conducting cultivation while using tannic acid as a sole carbon source can be mentioned. The culture is usable no matter whether it is a purified product or a unpurified product.

To complete the hydrolysis in a time as short as possible from the standpoints of suppressions of flavor and taste deteriorations and productivity, the use of the enzyme or culture is preferred.

The enzyme or culture, which has tannase activity and is to be used in the present invention, may preferably have an enzyme activity of from 500 to 100,000 U/g. An enzyme activity of lower than 500 U/g requires a great deal of enzyme in order to complete the treatment in an industrially-limited time, while an enzyme activity higher than 100,000 U/g leads to an excessively high enzyme reaction rate and hence, is difficult to control the reaction system. It is to be noted that "1 Unit" indicates an amount of enzyme that hydrolyses 1 micromole of ester bonds, which are contained in tannic acid, in water of 30° C.

The concentration of non-polymer catechins upon conducting treatment with the enzyme or culture having tannase activity may be preferably from 0.1 to 22 wt %, more preferably from 0.1 to 15 wt %, still more preferably from 0.5 to 10 wt %, even still more preferably from 0.5 to 3 wt %. A concentration lower than 0.1 wt % leads to a reduction in the amount to be adsorbed at the time of subsequent adsorption on the synthetic adsorbent, while a concentration higher than 22 wt % requires a long time for the hydrolysis treatment. Concentrations outside the above range are, therefore, not preferred from the standpoints of productivity and the taste of the tea extract.

In order to obtain such a percentage of non-polymer gallatecatechins as realizing an improvement in taste, it is preferred to add the enzyme or culture such that it falls within a range of from 0.01 to 10 wt % based on the non-polymer catechins in the tea extract. In order to complete the above-described hydrolysis treatment in an industrially-optimal enzyme reaction time, that is, two hours, the concentration of the enzyme or culture may be preferably from 0.01 to 7 wt %, more preferably from 0.03 to 5 wt %.

The enzyme or culture having tannase activity may be added preferably at from 1 to 300 Units/g-non-polymer catechins, more preferably at from 3 to 200 Units/g-non-polymer catechins, still more preferably at from 5 to 150 Units/g-non-polymer catechins, all, based on the non-polymer catechins in the green tea extract.

The temperature of the treatment with the enzyme or culture may be preferably from 0 to 70° C. in which optimal enzyme activity is available, with from 0 to 60° C. being more preferred and from 5 to 50° C. being still more preferred.

For the termination of the hydrolysis reaction with the enzyme or culture, it is necessary to inactivate the enzyme activity. This enzyme inactivation can be achieved by heating. The enzyme inactivation temperature may preferably be from 70 to 100° C. At an enzyme inactivation temperature lower than 70° C., the enzyme can hardly be inactivated to any sufficient extent in a short time, so that the hydrolysis reaction proceeds and cannot be terminated within the range of the percentage of non-polymer gallatecatechins. If a holding time after the arrival at the inactivation time is approximately 10 seconds or shorter, the enzyme activity can be hardly inactivated to sufficient extent so that the enzyme reaction proceeds. On the other hand, a holding time of 20 minutes or longer may cause the non-epimerization of non-polymer catechins in some instances. Accordingly, such an excessively short or long holding time is not preferred.

As an inactivation method for the enzyme reaction, it is possible to terminate the enzyme reaction by conducting heating batchwise or in such a continuous manner as in a plate-type heat exchanger. Further, the tea extract can be clarified by an operation such as centrifugation subsequent to the completion of the inactivation of the tannase treatment.

When a koji fungus is used as cells, for example, the koji fungus is placed in a tea extract having the concentration of non-polymer catechins in a range of preferably from 0.1 to 22 wt %, more preferably from 0.1 to 15 wt %, still more preferably from 0.5 to 15 wt %. The koji fungus may be added generally in a range of from 0.5 wt % to 10 wt %, preferably in a range of from 1.0 wt % to 5 wt %, both, based on the non-polymer catechins in the tea extract, although it substantially differs depending on the kind or the like of the koji fungus. As temperature conditions, from 45° C. to 70° C. is preferred, with from 50° C. to 60° C. being more preferred. The fermentation time may be generally from 12 hours to 20 days, preferably from 1 day to 10 days. The inactivation of the enzyme activity of the koji fungus is similar to the time at which the hydrolysis reaction with the enzyme or culture is brought to completion.

As the synthetic adsorbent, it is generally possible to such a synthetic adsorbent that has an insoluble, three-dimensionally-crosslinked structure, is substantially free of functional groups such as ion-exchanging groups, and preferably has an ion exchange capacity of lower than 1 meq/g. The matrix of the synthetic adsorbent may preferably be of the styrene base, methacrylic base, acrylic base or polyvinyl base, with a styrene base being preferred from the standpoint of separability between catechin and caffeine. Usable specific synthetic adsorbents include those having styrene-based matrices, for example, "AMBERLITE XAD4, XAD16HP, XAD1180, XAD2000" (supplier: Rohm & Haas USA), "DIAION HP20, HP21" (products of Mitsubishi Chemical Corporation), "SEPABEADS SP850, SP825, SP700, SP70" (products of Mitsubishi Chemical Corporation), and "VPOC1062" (product of Bayer AG); those having modified styrene-based matrices with adsorption capacity enhanced by nucleus substitution with bromine atoms, for example, "SEPABEADS SP205, SP206, SP207" (products of Mitsubishi Chemical Corporation); those having methacrylic matrices, for example, "DIAION HP1MG, HP2MG" (products of Mitsubishi Chemical Corporation) those having phenol-based matrices, for example, "AMBERLITE XAD761" (product of Rohm & Haas, Inc.); those having acrylic matrices, for example, "AMBERLITE XAD7HP" (product of Rohm & Haas, Inc.); those having polyvinyl-based matrices, for example, "TOYOPEARL HW-40C" (product of TOSOH CORPORATION); those having dextran-based matrices, for example, "SEPHADEX LH-20" (product of Pharmacia AB); etc.

As a manner of adsorbing the tea extract on the synthetic adsorbent, it is possible to adopt a batch process that adds the synthetic adsorbent to the tea extract or its aqueous solution, stirs the mixture, and subsequent to adsorption, recovers the synthetic adsorbent by a filter operation; or a column process that performs adsorption treatment through continuous treatment by using a column packed with the synthetic adsorbent. From the standpoint of productivity, however, a continuous treatment process by a column is preferred.

The column with the synthetic adsorbent packed therein may preferably be washed beforehand with a 95 vol % aqueous solution of ethanol at SV (space velocity)=0.5 to 10 $[h^{-1}]$ under loading conditions of from 2 to 10 [v/v] as a loading ratio to the synthetic adsorbent to remove the raw monomer of the synthetic adsorbent, impurities in the raw monomer, etc. The adsorptive capacity for non-polymer catechins can be improved by a method that subsequently conducts washing with water at SV=0.5 to 10 $[h^{-1}]$ under loading conditions of from 1 to 60 [v/v] as a loading ratio to the synthetic adsorbent to remove ethanol and hence to replace the solution, in which the synthetic adsorbent is contained, with a water-based medium.

As conditions for the loading of the tea extract on the column, the concentration of the non-polymer catechins in the tea extract upon adsorbing on the synthetic adsorbent may be preferably from 0.1 to 22 wt %, more preferably from 0.1 to 15 wt %, still more preferably from 0.5 to 10 wt %, even more preferably from 0.5 to 3 wt % from the standpoint of the efficiency of adsorption on the synthetic adsorbent.

As further conditions for loading the tea extract on the column packed with the synthetic adsorbent, it is preferred to load the tea extract at a loading rate of SV (space velocity)=0.5 to 10 $[h^{-1}]$ and from 0.5 to 20 [v/v] as a loading ratio to the synthetic adsorbent. A loading rate higher than 10 $[h^{-1}]$ may lead to insufficient adsorption, and a loading ratio greater than 20 [v/v] may result in unstable adsorption of non-polymer catechins.

It is preferred to wash the synthetic adsorbent with water or an aqueous solution of an organic solvent after the adsorption of the tea extract. In the present invention, it is more preferred for the production process (3) to conduct the washing step. As the aqueous solution for use in the washing of the synthetic adsorbent, water of pH 7 or lower is preferred from the standpoint of the recovery rate of catechin, and a mixed system with an organic solvent may also be used. As the organic solvent, acetone, methanol, ethanol or the like can be mentioned, with ethanol being preferred from the viewpoint of use in food. The concentration of the contained organic solvent may be preferably from 0 to 20 wt %, more preferably from 0 to 10 wt %, still more preferably from 0 to 5 wt % from the standpoint of the recovery rate of catechin.

In this washing step, it is preferred to remove impurities, which have adhered on the synthetic adsorbent, at a loading rate of SV (space velocity)=0.5 to 10 $[h^{-1}]$ and as a loading ratio to the synthetic adsorbent, at from 1 to 10 [v/v]. From the standpoints of impurity removing effects and the recovery rate of non-polymer catechins, it is more preferred to conduct washing at a loading rate of SV=0.5 to 5 $[h^{-1}]$ and as a loading ratio, at from 1 to 5 [v/v].

(a) When an aqueous solution of an organic solvent is used as an eluent, a water-soluble organic solvent is preferred as the organic solvent to be used for the elution of non-polymer catechins, and acetone, methanol, ethanol or the like can be mentioned. From the viewpoint of use in food, ethanol is preferred. Such an organic solvent leads to a high yield of non-polymer catechins. From the standpoint of a reduction in the amount of impurities, the organic solvent may preferably be used as an aqueous solution. As the concentration of the organic solvent, it is preferred to use the organic solvent preferably as a 1 to 80 wt % aqueous solution, more preferably as a 4 to 60 wt % aqueous solution, still more preferably as a 10 to 40 wt % aqueous solution.

Preferably, non-polymer catechins may be eluted at a loading rate of SV (space velocity)=0.5 to 5 $[h^{-1}]$ and as a loading ratio to the synthetic adsorbent, at from 1 to 15 [v/v]. From the standpoints of productivity and the recovery rate of non-polymer catechins, it is more preferred to conduct the elution at a loading rate of SV=1 to 3 $[h^{-1}]$ and as a loading ratio, at from 2 to 10 [v/v].

The use of an aqueous solution of an organic solvent as an eluent for the elution of non-polymer catechins is preferred from the standpoints of the simplification of steps and purification cost.

(b) When a basic aqueous solution is used as an eluent, it is possible to suitably use, as a basic aqueous solution for the elution of non-polymer catechins, an alkaline aqueous solution of an alkali metal salt, alkaline earth metal salt or the like, preferably a sodium- or potassium-containing alkaline aqueous solution, for example, an aqueous solution of sodium hydroxide, an aqueous solution of sodium carbonate or the like. The pH of the alkaline aqueous solution may preferably be in a range of from 7 to 14, and from the standpoint of the recovery rate of non-polymer catechins, from 9 to 13.8 may be preferred, with from 10 to 13.5 being more preferred. As a sodium-containing aqueous solution of pH 7 to 14, a 4% or lower aqueous solution of sodium hydroxide, a 1 N aqueous solution of sodium carbonate or the like can be mentioned. A basic aqueous solution and an organic solvent may be used as a mixture. From the standpoint of separability between caffeine and catechin, the concentration of the organic solvent may be preferably in a range of from 0 to 90 wt %, more preferably from 0 to 50 wt %, still more preferably from 0 to 20 wt %.

In the elution step, two or more basic aqueous solutions different in pH from each other can be used as the basic aqueous solutions for the elution, and in the ascending order of pH, these basic aqueous solutions can be brought into contact with the synthetic adsorbent. In each pH range, different non-polymer catechins and other components can be desorbed.

It is preferred to elute non-polymer catechins at a loading rate of SV (space velocity)=2 to 10 $[h^{-1}]$ and as a loading ratio to the synthetic adsorbent, at from 1 to 30 [v/v]. From the standpoints of productivity and the recovery rate of non-polymer catechins, it is more preferred to conduct the elution at a loading rate of SV=3 to 7 $[h^{-1}]$ and as a loading ratio, at from 3 to 15 [v/v].

The use of a basic aqueous solution as the eluent for the elution of non-polymer catechins is preferred from the standpoints of the color tone of the purified tea extract and its recovery rate through the treatment with activated carbon.

When eluted with the basic aqueous solution, the eluate of non-polymer catechins is basic. From the viewpoint of the stability of non-polymer catechins, the pH of the eluent may be adjusted preferably to from 7 or lower, more preferably to from 1 to 6, still more preferably to from 1 to 5, even still more preferably to from 2 to 4. Specifically, it is possible to use the neutralization with an acid, the removal of alkali metal ions by electrodialysis, or the removal of alkali metal ions with an ion exchange resin. As the ion exchange resin, the use of an $H^+$ cation-exchange resin is preferred. From the simplicity of the process, it is preferred to adjust the pH with an ion exchange resin. As a cation exchange resin, it is possible to use specifically "AMBERLITE 200CT, IR120B, IR124 or IR118", "DIAION SK1B, SK1BH, SK102, PK208 or PK212", or the like.

When eluted with the basic aqueous solution, it is preferred for improved taste and product stability to concentrate the eluate after neutralization and then to remove the precipitated impurities by solid-liquid separation. The concentration can be practiced by reduced-pressure distillation, thin film distillation, membrane concentration or the like. The concentration ratio may be preferably from 2 to 500 times, more preferably from 2 to 250 times, still more preferably from 2 to 125 times from the standpoints of taste and the separability of precipitated impurities. The concentration of non-polymer catechins after the concentration may be preferably from 0.1 to 60 wt, more preferably from 0.2 to 30 wt %, still more preferably from 0.5 to 15 wt % form the standpoints of taste and the separability of precipitated impurities. As a specific operation for the solid-liquid separation, filtration and/or centrifugal separation or the like can be mentioned. The turbidity of an aqueous solution of tea extract, which is obtain able as a water-soluble fraction by subjecting the aqueous solution of tea extract to solid-liquid separation, may preferably from 0.1 to 100 NTU, more preferably from 0.5 to 70 NTU, still more preferably from 1 to 50 NTU from the standpoints of the taste and stability of the beverage. Turbidity was measured by "Model 2100P" (manufactured by Hack Chemical Co.), and the values [unit: NTU] obtained in this invention can be used as indices for separation clarity.

As a solid-liquid separation method, any method usable in the food industry can be applied. As membrane filtration conditions upon conducting the solid-liquid separation by membrane filtration, for example, the temperature may be preferably from 5 to 70° C., more preferably from 10 to 40° C. From the standpoint of achieving a predetermined turbidity, the membrane pore size may range preferably from 0.1 to 10 µm, more preferably from 0.1 to 5 µm, still more preferably from 0.1 to 2 µm in view of the time required for the filtration and the separability of turbid components. As a measuring method of the membrane pore size, a general measuring method making use of mercury intrusion porosimetry, the bubble point test, bacterial filtration porosimetry or the like can be mentioned. It is, however, preferred to use a value determined by the bubble point test. As the material of membranes for use in the membrane filtration, high-molecular membranes, ceramic membranes, stainless steel membranes or the like can be used.

As a centrifugator, conventional equipment such as a separation-plate-type centrifugator, cylinder-type centrifugator or decanter-type centrifugator is preferred. As conditions for centrifugal separation, the temperature can be preferably from 5 to 70° C., more preferably from 10 to 40° C., and the rotational speed and time may desirably be set under conditions adjusted to give a predetermined turbidity. In the case of a separation-plate-type centrifugator, for example, the rotational speed may range preferably from 3,000 to 10,000 r/min, more preferably from 5,000 to 10,000 r/min, still more preferably from 6,000 to 10,000 r/min, and the time may range preferably from 0.2 to 30 minutes, more preferably from 0.2 to 20 minutes, still more preferably from 0.2 to 15 minutes.

The eluate (including those available in both of the above-described methods (a) and (b)) may preferably be brought into contact with activated carbon in an aqueous solution of an organic solvent from the standpoint of providing the tea extract with an improved color tone. As a raw material for the activated carbon, palm shells, wood or coal can be mentioned, with wood being preferred. As an activation process for activated carbon, steam activation, gas activation or chemical activation can be mentioned, with chemical activation being preferred.

Usable examples of commercially-available products include "ZN-50", "Y-10S", "GS-1", "GS-B" (product of Ajinomoto Fine-Techno Co., Ltd.); "KURARAY COAL GLC", "KURARAY COAL PK-D", "KURARAY COAL PW-D", "KURARAY COAL GW", "KURARAY COAL GA", "KURARAY COAL GA-D", "KURARAY COAL RP-15" (products of Kuraray Chemical Co., Ltd.); "SHIRASAGI AW50", "SHIRASAGI A", "SHIRASAGI P", "SHIRASAGI KL", "SHIRASAGI M", "SHIRASAGI C", "CARBORAFIN", "WH2C" (Japan Envirochemicals, Ltd.); "GM130A", "CW130A", "CW130AR", "CW350AR", "GL130A", "SG", "SGA", "SGP" (products of Futamura Chemical Co., Ltd.); "YASHICOAL", "MAS BRAND", "BAIHO BRAND", "BAIHO F BRAND" (product of Taihei Chemical Industrial Co., Ltd.); and "CPG", "CAL", "S80A" (products of Calgon Mitsubishi Chemical Corporation).

From the standpoint of providing the product with an improved color tone, the standpoint of reducing the amount of activated carbon to be used and the standpoint of improving the recovery rate, activated carbon to be described herein after is preferred as the activated carbon. The average pore size may be preferably from 0.5 to 10 nm (nanometers), more preferably from 1.0 to 9.0 nm (nanometers), still more preferably from 2.0 to 8.0 nm (nanometers). The pore volume may be preferably from 0.01 to 2.5 mL/g, more preferably from 0.1 to 2.0 mL/g, still more preferably from 0.5 to 1.7 mL/g. The specific surface area may be in a range of preferably from 800 to 2,000 $m^2/g$, more preferably from 900 to 1,600 $m^2/g$, still more preferably from 1,000 to 1,500 $m^2/g$. It is to be noted that these physical values are values based on the nitrogen adsorption method.

The activated carbon may be added in a proportion of preferably from 1 to 200 parts by weight, more preferably from 5 to 100 parts by weight, still more preferably from 10 to 80 parts by weight per 100 parts by weight of the non-polymer catechins in the eluate, because the effect of purification and the recovery rate are improved and the cake resistance in the filtration step is small.

As the organic solvent to be used upon bringing the eluate into contact with the activated carbon, a water-soluble organic solvent is preferred, and acetone, methanol, ethanol or the like can be mentioned. From the viewpoint of use in food, ethanol is preferred. From the standpoints of providing the resulting product with a good color tone, recovering non-polymer catechins in a high yield, and reducing the content of impurities, it is necessary to use such an organic solvent as an aqueous solution. As the concentration of the organic solvent, the organic solvent may be used preferably as a 1 to 80 wt % aqueous solution, more preferably as a 2 to 70 wt % aqueous solution, still more preferably as a 5 to 50 wt % aqueous solution, even more preferably as a 7 to 40 wt % aqueous solution.

Upon bringing the eluate into contact with the activated carbon, the concentration of non-polymer catechins in the aqueous solution of the organic solvent may be set preferably at from 0.5 to 20 wt %, more preferably at from 1 to 15 wt %, still more preferably at from 2 to 8 wt % from the standpoints of improving the effects of purification and the recovery rate.

Upon bringing the eluate from the synthetic adsorbent into contact with the activated carbon, it is preferred to adjust the concentration of the solvent and the concentration of non-polymer catechins to predetermined levels by adding water or an aqueous solution of an organic solvent or conducting reduced-pressure concentration, membrane concentration, desolvation or the like.

As a method for bringing the eluate into contact with the activated carbon, it is possible to adopt a stirring tank method that the activated carbon is added to the eluate, the mixture is stirred, and subsequent to adsorption, the activated carbon is recovered by a filter operation; or a column method that the eluate is brought into contact through continuous treatment by using a column packed with the activated carbon. From the standpoint of productivity, however, the continuous treatment method by the column method is preferred.

The purified tea extract obtained by the present invention contains non-polymer catechins at from 25 to 95 wt % in its solid content. From the standpoint of addition to beverages, however, the purified tea extract may contain non-polymer catechins preferably at from 40 to 95 wt %, more preferably at from 50 to 90 wt %, still more preferably at from 60 to 85 wt %. From the stand point of taste, on the other hand, non-polymer catechins may be contained preferably at from 45 to 90 wt %, more preferably at from 50 to 88 wt %, still more preferably at from 55 to 85 wt %, even more preferably at from 60 to 83 wt % in the solid content.

From the standpoints of the effectiveness of physiological effects of non-polymer catechins and the reduction of bitterness, the proportion of gallates, which comprise catechingallates, epicatechingallates, gallocatechingallates and epigallocatechingallates, in the whole non-polymer catechins in the purified tea extract obtained by the present invention (the percentage of gallates) may be preferably from 0 to 70 wt %, more preferably from 1 to 60 wt %, still more preferably from 2 to 40 wt %, even more preferably from 10 to 35 wt %. From the viewpoints of reducing the bitterness and productivity, on the other hand, the proportion of gallates in the whole non-polymer catechins (the percentage of gallates) may be preferably from 0.001 to 47 wt %, more preferably from 0.01 to 45 wt %, still more preferably from 0.1 to 43 wt %, even more preferably from 1 to 40 wt %, still even more preferably from 5 to 35 wt %.

From the standpoint of improving the taste, the concentration of caffeine in the purified tea extract obtained in the present invention may be, based on non-polymer catechins, at a caffeine/non-polymer catechins (weight ratio)=preferably 0 to 0.2, more preferably 0 to 0.15, still more preferably from 0 to 0.1, even more preferably 0 to 0.05, still even more preferably 0 to 0.035. From the standpoint of improving the taste, the concentration of caffeine may also be, based on non-polymer catechins, at a caffeine/non-polymer catechins (weight ratio)=preferably 0.2 or smaller, more preferably 0.15 or smaller, still more preferably 0.1 or smaller, even more preferably 0.05 or smaller, but preferably 0 or greater, more preferably 0.0001 or greater, still more preferably 0.001 or greater.

From the standpoints of improving the taste and color tone, the ratio (weight ratio) of gallic acid to non-polymer catechins in the purified tea extract obtained in the present invention may be preferably from 0 to 0.1, more preferably from 0 to 0.07, still more preferably from 0 to 0.05. From the standpoint of taste, the ratio (weight ratio) of gallic acid to non-polymer catechins may be preferably 0.3 or smaller, more preferably 0.1 or smaller, still more preferably 0.07 or smaller, but preferably 0 or greater, more preferably 0.0001 or greater, still more preferably 0.001 or greater.

From the standpoints of a color tone when added to a beverage and purification cost, the tone of the purified tea extract obtained in the present invention may be preferably from 0 to 0.8, more preferably from 0.01 to 0.75, still more preferably from 0.1 to 0.6, even more preferably from 0.2 to 0.5 in terms of the color tone (/cm) at 450 nm when the purified tea extract is formed into an aqueous solution having a 1 wt % concentration of non-polymer catechins.

By controlling the elution operation in the step of eluting non-polymer catechins from the synthetic adsorbent in the process of the present invention, a purified tea extract having a high concentration of non-polymer catechins and a reduced content of caffeine can also be obtained (the production process (3)).

As conditions for the elution and fractionation from the synthetic adsorbent to obtain the purified tea extract of the present invention, the percentage of non-gallates in the fractionated tea extract may be preferably from 55 to 100 wt %, more preferably from 60 to 99 wt %, still more preferably from 65 to 98 wt %, even more preferably from 65 to 90 wt %, from the standpoints of the effectiveness of physiological effects of non-polymer catechins and a reduction in bitterness.

As further conditions for the fractionation and elution from the synthetic adsorbent, the percentage of caffeine in the fractionated tea extract may be, based on the non-polymer catechins, at a caffeine/non-polymer catechin (weight ratio)=preferably 0.15 or smaller, more preferably from 0 to 0.1, still more preferably from 0 to 0.08, even more preferably from 0 to 0.05, still even more preferably from 0 to 0.035, from the standpoints of taste improvements and physiological effects.

As further conditions for the elution and fractionation from the synthetic adsorbent, the ratio of gallic acid to non-polymer catechins in the fractionated tea extract (gallic acid/non-polymer catechins) (weight ration) may be preferably 0.1 or smaller, more preferably from 0 to 0.07, still more preferably from 0 to 0.05, even more preferably from 0 to 0.02, from the standpoint of improvements in flavor and taste.

As further conditions for the elution and fractionation from the synthetic adsorbent available in the present invention, the tone of the fractionated tea extract may be preferably 3 or smaller, more preferably from 0.01 to 2, still more preferably from 0.1 to 1, even more preferably from 0.2 to 0.5, in terms of the color tone (/cm) at 450 nm when the fractionated tea extract is formed into an aqueous solution having a 1 wt % concentration of non-polymer catechins, from the standpoints of a color tone when added to a beverage and purification cost.

As further conditions for the elution and fractionation from the synthetic adsorbent in the present invention, the proportions of non-polymer catechin components in the fractionated tea extract may preferably be, from the standpoints of improvements in the flavor and taste of the purified tea extract, physiological effects and a cost reduction, such that, when the proportion of the component of non-polymer catechins before adsorption is assumed to be 1, the proportion of non-gallates ranges from 1.2 to 10, the proportion of gallocatechins ranges from 1.0 to 1.3 and the proportion of epicatechins ranges from 0.8 to 1.0.

As further conditions for the elution and fractionation from the synthetic adsorbent, the proportion of non-gallates in the fractionated tea extract may be preferably from 1.3 to 5, more preferably from 1.4 to 4, still more preferably from 1.45 to 3, even more preferably from 1.5 to 2, when the proportion of non-gallates in the tea extract before adsorption is assumed to be 1. As yet further conditions for the elution and fractionation from the synthetic adsorbent, the proportion of gallocatechins in the fractionated tea extract may be preferably from 1.01 to 1.28, more preferably from 1.02 to 1.26, still more preferably from 1.04 to 1.24, even more preferably from 1.06 to 1.22, when the proportion of gallocatechins in the tea extract before adsorption is assumed to be 1. As yet further conditions for the elution and fractionation from the synthetic adsorbent, the proportion of epicatechins in the fractionated tea extract may be preferably from 0.82 to 1.0, more preferably from 0.86 to 0.99, still more preferably from 0.90 to 0.99, even more preferably from 0.94 to 0.98, when the proportion of epicatechins in the tea extract before adsorption is assumed to be 1.

After the tea extract is adsorbed on the synthetic adsorbent, a washing solution is brought into contact with the synthetic adsorbent, and an eluent is then brought into contact with the synthetic adsorbent to fractionate, into a fraction, 10 to 60% of non-polymer catechins adsorbed on the synthetic adsorbent.

In the non-polymer catechins adsorbed on the synthetic adsorbent, the amount of the non-polymer catechins to be eluted into the fraction (which will be called "the recovery rate of non-polymer catechins [%]") can be controlled depending on elution conditions such as the kind and concentration of the eluent and its amount to be brought into contact. The recovery rate of non-polymer catechins is from 10 to 60%. From the standpoints of controlling the recovery rate of catechin high, the content of caffeine low and the percentage of non-polymer non-gallate catechins high and improving the flavor and taste, the recovery rate of non-polymer catechins may be preferably from 15 to 55%, more preferably from 20 to 50%, still more preferably from 25 to 45%.

From the standpoints of controlling the content of caffeine low and the percentage of non-polymer non-gallatecatechins high, improving the flavor and taste, and permitting easy control of the amount of non-polymer catechins to be eluted into a fraction, the eluent may preferably bean aqueous solution of an organic solvent or a basic aqueous solution.

When eluted with the aqueous solution of the organic solvent or the basic aqueous solution, non-gallates are eluted earlier than gallates.

The purified tea extract obtained by the present invention can be used as a beverage as it is. The solvent may be removed by a method such as reduced-pressure concentration or thin-film concentration. When powder is desired as the product form of the purified tea extract, the purified tea extract can be formed into powder by a method such as spray drying or lyophilization.

The concentration of non-polymer catechins in the packaged beverage making use of the purified tea extract of the present invention may be adjusted preferably to from 0.05 to 0.5 wt %, more preferably to from 0.06 to 0.5 wt %, still more preferably to from 0.08 to 0.5 wt %, even more preferably to from 0.092 to 0.4 wt %, still even more preferably to from 0.11 to 0.3 wt %, yet still even more preferably to from 0.12 to 0.3 wt %, because a packaged beverage having a good flavor and taste without any coarse taste can be obtained.

The percentage of gallates as the generic term, which consist of catechingallates, epicatechingallates, gallocatechingallates and epigallocatechingallates, based on the whole non-polymer catechins in the packaged beverage may be preferably from 0 to 70 wt %, more preferably from 1 to 60 wt %, still more preferably from 2 to 40 wt %, even more preferably from 10 to 35 wt % from the standpoints of taste and the effectiveness of physiological effects of non-polymer catechins.

The content of gallic acid in the packaged beverage according to the present invention may preferably be lower than 10 mg/100 mL from the standpoints of reducing effects for bitterness and sour taste and the storage stability of flavor, taste and color tone.

The packaged beverage according to the present invention can be used as a tea-based beverage or a non-tea-based beverage. As the non-tea-based beverage, a sour beverage containing a sweetener and a fruit flavor, a sports drink or an isotonic drink can be mentioned specifically.

As the sweeter for use in the packaged beverage according to the present invention, an artificial sweetener, carbohydrate or glycerol (for example, glycerin) can be employed.

The term "fruit flavor" embraces kaju and kouryo. In general, kaju is called "fruit juice" while kouryo is called "flavor". Natural or synthetic flavors and fruit juices, including such kaju and kouryo, can be used in the present invention.

When the packaged beverage according to the present invention is formulated as a sports drink or isotonic drink, it is preferred to incorporate sodium ions and/or potassium ions.

The beverage according to the present invention may further contain a sour seasoning as needed. As the sour seasoning, an edible acid such as malic acid, citric acid, tartaric acid or fumaric acid can be mentioned. A sour seasoning may also be used to adjust the pH of the beverage according to the present invention.

The addition of a bitterness/astringency suppressor to the packaged beverage according to the present invention facilitates its drinking, and therefore, is preferred. Although no particular limitation is imposed on the bitterness/astringency suppressor to be used, a cyclodextrin is preferred. As the cyclodextrin, an $\alpha$-, $\beta$- or $\gamma$-cyclodextrin or a branched $\alpha$-, $\beta$- or $\gamma$-cyclodextrin can be used. In the beverage, a cyclodextrin may be contained preferably at from 0.005 to 0.5 wt %, more preferably at from 0.01 to 0.3 wt %. To the packaged beverage according to the present invention, it is possible to add, either singly or in combination, additives such as antioxidants, various esters, inorganic salts, colors, emulsifiers, preservatives, seasoning agents, sweeteners, sour seasonings, gums, emulsifiers, oils, vitamins, amino acids, fruit extracts, flower honey extracts, pH regulators and quality stabilizers.

The pH of the package beverage according to the present invention may be controlled preferably to from 2 to 7, more preferably to from 2 to 6.5 at 25° C. from the standpoints of taste and the stability of non-polymer catechins.

In the packaged beverage according to the present invention, it is also preferred, from purpose of assuring a minimum daily intake to obtain the physiological effects of catechin, to add catechin in an amount of 300 mg or more, preferably 450 mg or more, still more preferably 500 mg or more per can or bottle (350 to 500 mL) of the packaged beverage according to the present invention.

The above-described packaged beverage can be produced, for example, by filling the beverage in a package such as a metal can and, when heat sterilization is feasible, conducting heat sterilization under sterilization conditions as prescribed in the Food Sanitation Act of Japan. For those which cannot be subjected to retort sterilization like PET bottles or paper packages, a process is adopted such that the beverage is sterilized beforehand at a high temperature for a short time under similar sterilization conditions as those described above, for example, by a plate-type heat exchanger or the like, is cooled to a particular temperature, and is then filed in a package. Under aseptic conditions, additional ingredients may be added to and filled in a beverage-filled package.

EXAMPLES (1) Measurements of Catechins, Caffeine and Gallic Acid

A high-performance liquid chromatograph (model: "SCL-10AVP") manufactured by Shimadzu Corporation was used. The chromatograph was fitted with a liquid chromatograph column packed with octadecyl-introduced silica gel, "L-Column, TM ODS" (4.6 mm in diameter×250 mm; product of Chemicals Evaluation and Research Institute, Japan). A sample solution was filtered through a filter (0.45 μm), and then subjected to chromatography at a column temperature of 35° C. by the gradient elution method. A solution A, mobile phase, was a solution containing acetic acid at 0.1 mol/L in distilled water, while a solution B, mobile phase, was a solution containing acetic acid at 0.1 mol/L in acetonitrile. The measurement was conducted under the conditions of 20 μL sample injection volume and 280 nm UV detector wavelength.

(2) Assessment of Tastes of Purified Products of Tea Extracts

The purified tea extract obtained in each Example was diluted with deionized water such that the content of non-polymer catechins dropped to 0.175% [w/v], and an aliquot (40 mL) of the diluted extract was placed in a 50-mL pressure-resistant glass vessel. Sodium ascorbate (0.1 wt %) was added to the diluted extract, and its pH was adjusted to 6.4 with a 5% aqueous solution of sodium bicarbonate. After having been purged with nitrogen, the pH-adjusted extract was subjected to thermal sterilization at 121° C. for 10 minutes in an autoclave. Subsequently, its bitterness was assessed by a panel of five assessors with respect to a foretaste and an aftertaste. The assessment of bitterness was performed by the quinine sulfate method.

(3) Assessment of Bitterness by the Quinine Sulfate Method

The Equivalent Concentration Test Method

Quinine sulfate dihydrate was adjusted to concentrations corresponding to the bitterness intensities shown in the table. After each assessment sample was tasted, a determination was made concerning to which sample of standard bitterness solutions the intensity of bitterness was equal. The intensity of bitterness was confirmed by the panel of five assessors. (References: Newly-edited "Organoleptic Test Handbook" in Japanese, PP 448-449, Organoleptic Test Committee, Union of Japanese Scientists and Engineers; Perception & Psychophysics, 5, pp. 347-351, 1696).

TABLE 1

| Concentrations of Standard Bitter Solutions | |
| --- | --- |
| Bitterness intensity | Quinine sulfate dihydrate (g/100 mL, aq.) |
| 1 | 0.00023 |
| 2 | 0.00050 |
| 3 | 0.00094 |
| 4 | 0.00157 |
| 5 | 0.00241 |
| 6 | 0.00388 |
| 7 | 0.00608 |
| 8 | 0.00985 |
| 9 | 0.01572 |
| 10 | 0.02568 |

(4) Measurement of Color Tone

Using a HITACHI spectrophotometer (Model: U-2001) each membrane-filtered product of green tea extract was diluted with deionized water in a glass cell to provide an aqueous solution in which the concentration of non-polymer catechins was 1 wt %, and was then measured. The measurement wavelength of the spectrophotometer at the time of the analysis was set at 450 nm.

Example 1

Hot water of 88° C. (45 kg) was added to green tea leaves (produce of Kenya, large leaf variety; 3 kg). After batchwise extraction for 60 minutes under stirring, coarse filtration was conducted through a 100-mesh screen. To remove fine powder from the extract, a centrifugal separation operation was then performed to obtain a "green tea extract" (37.2 kg, pH 5.4) (the concentration of non-polymer catechins in the green tea extract=0.89 wt %, the percentage of gallates in the green tea extract=52.3 wt %, caffeine: 0.17 wt %). The green tea extract was held at the temperature of 15° C., and tannase ("TANNASE KTFH", product of Kikkoman Corporation; 500 U/g) was then added to the green tea extract to give a concentration of 430 ppm. The solution was held for 55 minutes. When the percentage of gallates had dropped to 30.5 wt %, the solution was heated to 90° C., at which the solution was held for 2 minutes to inactivate the enzyme so that the reaction was terminated (pH 5.1). Under the conditions of 70° C. and 6.7 kPa, concentration processing was performed to a Brix concentration of 20% by reduced-pressure concentration. Further, the concentrate was spray- -dried to obtain a powdery "tannase-treated green tea extract" (0.9 kg). The thus-obtained green tea extract had the following data the content of non-polymer catechins: 27.8 wt %, the percentage of non-polymer catechingallates: 30.3 wt %, the content of caffeine: 6.74 wt %, and gallic acid: 3.58 wt %. The "tannase-treated green tea extract" (285 g) was dissolved under stirring at 25° C. for 30 minutes in deionized water (8,550 g) (tannase-treated solution).

Next, a synthetic adsorbent "SP-70" (product of Mitsubishi Chemical Corporation; 2,209 mL) was packed in a stainless steel column 1 (110 mm inner diameter×230 mm height, volume: 2,185 mL). An ion-exchange resin "SK1BH" (product of Mitsubishi Chemical Corporation; 852 mL) was packed in a stainless steel column (38 mm inner diameter×770 mm height, volume: 877.4 mL). On each of the columns, 95 (v/v) ethanol (4 volumes relative to the packed resin) was loaded beforehand at SV=5 ($h^{-1}$), followed by the loading of water (10 volumes relative to the packed resin) to wash the column. Subsequently, the tannase-treated solution (8,835 g, 4 volumes relative to the synthetic adsorbent) obtained as described above was loaded at SV=1 ($h^{-1}$) on the column 1 and the outflow was discarded. The column 1 was then washed at SV=2 ($h^{-1}$) with water (2,209 mL, one volume relative to the synthetic adsorbent). Subsequent to the water-washing, a 0.1 wt % aqueous solution of sodium hydroxide (pH 12.4; 13,256 mL, 6 volumes relative to the synthetic adsorbent) was loaded at SV=5 ($h^{-1}$). The eluate was continuously loaded on the column 2 to effect deionization, so that a non-polymer catechin composition (13,080 g; pH 3.3) was obtained. Non-polymer catechins were contained at 0.38 wt % in the extract, and the percentage of gallates in the non-polymer catechin composition was 28.6 wt %. Further, caffeine was 0 wt %, and the amount of gallic acid was 0.002 wt %. Non-polymer catechins in the solid content of the tea extract amounted to 69.0 wt %. Reduced-pressure concentration was then conducted under the conditions of 40° C. and 2.6 kPa to a non-polymer catechin concentration of 6% (turbidity: 208 NTU). The thus-concentrated tea extract was then caused to pass through a 0.8-μm cellulose acetate membrane ("ADVANTEC: C080A090C), and by solid-liquid separation, the tea extract was separated from suspended matters to obtain a "resin-treated product 1" (turbidity: 1.5 NTU). Granular activated carbon "TAIKO SGP" (product of Futamura Chemical Co., Ltd.; 6.5 g) was then packed in a stainless steel column 3 (22 mm inner diameter×145 mm height, volume: 55.1 mL). The "resin-treated product 1" was formed into a solution such that the concentration of non-polymer catechins and the concentration of ethanol become 4% and 20 wt %, respectively. An aliquot (267 g) of the solution was loaded at SV=2 ($h^{-1}$) on the column 3 (the amount of the activated carbon was 0.6 times relative to the amount of non-polymer catechins). Subsequently, filtration was conducted through a 0.2-μm membrane filter. Finally, deionized water (50 g) was added, ethanol was distilled off under the conditions of 40° C. and 2.7 kPa, and then, the water content was adjusted to obtain an "activated-carbon-treated product 1" (2.1 NTU). Non-polymer catechins were contained at 13.7 wt % in the extract, and the percentage of gallates in the non-polymer catechin composition was 23.5 wt %. Further, caffeine was 0 wt %, and the amount of gallic acid was 0.054 wt %. Non-polymer catechins in the solid content of the tea extract amounted to 79.6 wt %.

Comparative Example 1

The "resin-treated product 1" in Example 1.

Example 2

A synthetic adsorbent "SP-70" (product of Mitsubishi Chemical Corporation; 2,048 mL) was packed in a stainless steel column 4 (110 mm inner diameter×230 mm height, volume: 2, 185 mL). The column was washed beforehand in a similar manner as in Example 1. The tannase-treated solution (8,191 g, 4 volumes relative to the synthetic adsorbent) obtained in Example 1 was loaded at SV=1 ($h^{-1}$) on the column 4 and the outflow was discarded. The column 4 was then washed at SV=2 ($h^{-1}$) with water (2,048 mL, one volume relative to the synthetic adsorbent). Subsequent to the water-washing, a 20 wt % aqueous solution of ethanol (12,287 mL, 6 volumes relative to the synthetic adsorbent) was loaded at SV=2 ($h^{-1}$) to obtain a non-polymer catechin composition (12,090 g; pH 2.1). Non-polymer catechins were contained at 0.51 wt % in the extract, and the percentage of gallates in the non-polymer catechin composition was 27.4 wt %. Further, caffeine was 0.075 wt %, and the amount of gallic acid was 0.002 wt %. Non-polymer catechins in the solid content of the tea extract amounted to 62.5 wt %. Reduced-pressure concentration was then conducted at 40° C. and 2.7 kPa to distill off ethanol, and then, the water content was adjusted to obtain a "resin-treated product 2". Subsequently, it was subjected to treatment in contact with activated carbon in a similar manner as in Example 1 (the amount of the activated carbon was 0.6 times relative to the non-polymer catechins) to obtain a "activated-carbon-treated product 2" (1.7 NTU). Non-polymer catechins were contained at 15.0 wt % in the extract, and the percentage of gallates in the non-polymer catechin composition was 20.9 wt %. Further, caffeine was 0.264 wt %, and the amount of gallic acid was 0.057 wt %. Non-polymer catechins in the solid content amounted to 72.8 wt %.

Comparative Example 2

The "resin-treated product 2" in Example 2.

The results of comparisons between Example 1 and Comparative Example 1 and between Example 2 and Comparative Example 2 are shown in Table 2.

TABLE 2

| Reaction conditions, test items and results of organoleptic assessments | | Example 1 | Comp. Ex. 1 | Example 2 | Comp. Ex. 2 |
|---|---|---|---|---|---|
| Hydrolysis treatment | | Applied | Applied | Applied | Applied |
| Percentage of gallates in non-polymer catechins in hydrolysis-treated product (product before resin treatment) | [wt %] | 27.8 | 27.8 | 27.8 | 27.8 |
| Separation method from resin | [wt %] | Aq. NaOH soln. | Aq. NaOH soln. | Aq. EtOH soln. | Aq. EtOH soln. |
| Concentration of aqueous solution of organic solvent upon bringing into contact with activated carbon | [wt %] | 20 | — | 20 | — |
| Non-polymer catechins | [wt %] | 13.7 | 6.0 | 15.0 | 6.0 |
| Non-polymer catechins in solid content | [wt %] | 79.6 | 69.0 | 72.8 | 62.5 |
| Percentage of gallates in non-polymer catechins | [wt %] | 23.5 | 28.6 | 20.9 | 27.4 |
| Caffeine | [wt %] | 0.000 | 0.000 | 0.264 | 0.882 |
| Gallic acid | [wt %] | 0.054 | 0.032 | 0.057 | 0.024 |
| Bitterness in foretaste | | 5.0 | 5.0 | 5.0 | 5.0 |
| Bitterness in aftertaste | | 5.0 | 5.5 | 5.0 | 5.3 |
| Color tone (450 nm) | | 0.23 | 2.78 | 0.35 | 2.15 |

As evident from Table 2, a purified tea extract having a lowered caffeine content, an aftertaste with reduced bitterness and an improved color tone lowered in caffeine, reduced in the bitterness of aftertaste and improved in color tone can be obtained by adsorbing a tea extract on a synthetic adsorbent, conducting elution with an aqueous solution of an organic solvent or a basic aqueous solution and then treating the eluate in an aqueous solution of an organic solvent. The extract is, therefore, useful not only as a tea-based beverage but also as a non-tea-based beverage.

Examples 3-6

Following the procedure of Example 1, operations were performed without any hydrolysis treatment and also by conducting hydrolysis treatment until the percentage of gallates became about 3.5% and setting the concentration of the aqueous solution of the organic solvent at 20 wt % and 60 wt %, respectively, upon bringing into contact with the activated carbon (the amount of the activated carbon was 0.6 times relative to non-polymer catechins). The results are shown in Table 3.

Comparing the cases of 20 wt % with the cases of 60 wt % as the concentration of an aqueous solution of an organic solvent upon bringing into contact with activated carbon in Table 3, 20 wt % is preferred in color tone but 60 wt % is preferred in recovery rate.

Examples 7-9, Comparative Examples 3-4

The procedures of Example 1 and Example 2 were followed except that the concentration of the aqueous solution of the organic solvent upon bringing into contact with the activated carbon was set at 0 wt %, 7.5 wt % and 20 wt % and the contacting operation with the activated carbon was conducted by the stirring tank method (the amount of the activated carbon was 0.6 times relative to the amount of non-polymer catechins). The results are shown in Table 4.

TABLE 3

| Reaction conditions, test items and results of organoleptic assessments | | Example 3 | Example 4 | Example 5 | Example 6 |
|---|---|---|---|---|---|
| Hydrolysis treatment | | Not applied | Not applied | Applied | Applied |
| Percentage of gallates in non-polymer catechins in hydrolysis-treated product (product before resin treatment) | [wt %] | 55.8 | 54.3 | 3.5 | 3.4 |
| Separation method from resin | [wt %] | Aq. NaOH soln. | Aq. NaOH soln. | Aq. NaOH soln. | Aq. NaOH soln. |
| Concentration of aqueous solution of organic solvent upon bringing into contact with activated carbon | [wt %] | 20 | 60 | 20 | 60 |
| Percentage of gallates in non-polymer catechins | [wt %] | 53.2 | 53.9 | 1.1 | 2.1 |
| Color tone (450 nm) | | 0.22 | 0.31 | 0.42 | 0.74 |
| Recovery rate from treatment with activated carbon | [wt %] | 69 | 79 | 73 | 81 |

TABLE 4

| Reaction conditions, test items and results of organoleptic assessments | | Example 7 | Example 8 | Comp. Ex. 3 | Example 9 | Comp. Ex. 4 |
|---|---|---|---|---|---|---|
| Hydrolysis treatment | | Applied | Applied | Applied | Applied | Applied |
| Percentage of gallates in non-polymer catechins in hydrolysis-treated product (product before resin treatment) | [wt %] | 27.1 | 28.2 | 27.2 | 26.8 | 26.8 |
| Separation method from resin | [wt %] | Aq. NaOH soln. | Aq. NaOH soln. | Aq. NaOH soln. | Aq. EtOH soln. | Aq. EtOH soln. |
| Concentration of aqueous solution of organic solvent upon bringing into contact with activated carbon | [wt %] | 7.5 | 20 | 0 | 20 | 0 |
| Percentage of gallates in non-polymer catechins | [wt %] | 21.2 | 24.1 | 19.4 | 22.6 | 15.6 |
| Color tone (450 nm) | | 0.48 | 0.43 | 0.86 | 0.61 | 0.97 |
| Recovery rate from treatment with activated carbon | [wt %] | 78 | 75 | 68 | 71 | 60 |

As evident from Table 4, the tone and recovery rate are better in the case that the concentration of an aqueous solution of an organic solvent upon bringing into contact with activated carbon is set at 7.5 wt % or 20 wt % in comparison with the case that the concentration of an aqueous solution of an organic solvent upon bringing into contact with activated carbon is set at 0 wt % (water is used as a solvent).

Example 10

Using the "activated-carbon-treated product 1" of Example 1, the beverage described in Table 5 was prepared for packaging application. Under the Food Sanitation Act of Japan, the beverage was subjected to sterilization treatment and then to hot-pack filling so that a packaged beverage was produced.

After the thus-produced packaged beverage was stored at 37° C. for 30 days, it was assessed. It was good in external appearance and the stability of taste.

TABLE 5

| Names of materials | Added amounts (g) |
|---|---|
| Sugar | 1.50 |
| Salt | 0.33 |
| Sweetener | 0.01 |
| VC | 0.05 |
| Fruit juice | 0.10 |
| Flavor | 0.20 |
| Catechin preparation (Example 1) | 1.28 |
| Deionized water | Balance |
| Total | 100.00 |

Example 11

A crude catechin preparation (product of Mitsui Norin Co., Ltd., the concentration of non-polymer catechins=32.0 wt %, the percentage of non-polymer catechingallates=52.2 wt %, caffeine=5.88 wt %; 150 g) was dissolved at 25° C. for 30 minutes under stirring in deionized water (4,500 g) to obtain a green tea extract solution (pH 5.3). Next, a synthetic adsorbent "SP-70" (product of Mitsubishi Chemical Corporation; 861 mL) packed in a stainless steel column 1 (60 mm inner diameter×360 mm height, volume: 1,017.4 mL) was washed beforehand at SV=5 ($h^{-1}$) with 95 (v/v) ethanol (3,444 mL), and then at SV=5 ($h^{-1}$) with water (8,610 mL). An ion-exchange resin "SK1BH" (product of Mitsubishi Chemical Corporation; 350.6 mL) packed in a stainless steel column 2 (38 mm inner diameter×340 mm height, volume: 385.4 mL) was washed beforehand at SV=5 ($h^{-1}$) with 95 (v/v) ethanol (1402.4 mL), and then at SV=5 ($h^{-1}$) with water (3,506 mL). Subsequently, the green tea extract solution (3,435 g, 4 volumes relative to the synthetic adsorbent) was loaded at SV=1 ($h^{-1}$) on the stainless steel column 1 and the outflow was discarded. The column 1 was then washed at SV=2 ($h^{-1}$) with water (861 mL, one volume relative to the synthetic adsorbent). Subsequent to the water-washing, a 0.1 wt % aqueous solution of sodium hydroxide (pH 12.5; 12,900 mL, 15 volumes relative to the synthetic adsorbent) was loaded at SV=5 ($h^{-1}$) to obtain a non-polymer catechin eluate. The eluate was continuously loaded on the stainless steel column 2 to conduct deionization, so that a non-polymer catechin composition (12,860 g, pH 3.5) was obtained. Non-polymer catechins were contained at 0.24 wt % in the composition, the recovery rate of non-polymer catechins from the tea extract solution was 92.4%, and the percentage of gallates in the non-polymer catechin composition was 52.9 wt %. Further, caffeine was 0 wt %. The amount of non-polymer catechins in the solid content of the tea extract was 69.2 wt %. By reduced-pressure concentration, then on-polymer catechin composition was subjected at 40° C. and 2.6 kPa to concentration processing to a non-polymer catechin concentration of 6% (turbidity: 322 NTU), so that a "concentrated green tea extract 1" was obtained. Centrifugal separation (8,000 r/min) was then conducted at 25° C. for 15 minutes, and by solid-liquid separation, the tea extract was separated from suspended matters to obtain a "purified green tea extract 1" (turbidity: 39.5 NTU).

Example 12

The "concentrated green tea extract 1" obtained in Example 11 was caused to pass through a 0.8-μm cellulose acetate membrane ("ADVANTEC: C080A090C") to separate suspended matters, so that a "purified green tea extract 2" (turbidity: 1.8 NTU) was obtained.

Example 13

Hot water of 88° C. (45 kg) was added to green tea leaves (produce of Kenya, large leaf variety; 3 kg). After batchwise extraction for 60 minutes under stirring, coarse filtration was conducted through a 100-mesh screen. To remove fine powder from the extract, a centrifugal separation operation was then performed to obtain a "green tea extract" (37.2 kg, pH 5.4) (the concentration of non-polymer catechins in the green tea extract=0.89 wt %, the percentage of gallates in the green tea extract=52.3 wt %, caffeine: 0.17 wt %).

The green tea extract was held at the temperature of 15° C., and tannase ("TANNASE KTFH", product of Kikkoman Corporation; 500 U/g) was then added to the green tea extract to give a concentration of 430 ppm. The solution was held for 55 minutes. When the percentage of gallates had dropped to 30.5 wt %, the solution was heated to 90° C., at which the solution was held for 2 minutes to inactivate the enzyme so that the reaction was terminated (pH 5.1). Under the conditions of 70° C. and 6.7 kPa, concentration processing was performed to a Brix concentration of 20%. Further, the concentrate was spray-dried to obtain a powdery "tannase-treated green tea extract" (0.9 kg). The thus-obtained green tea extract had the following data—the content of non-polymer catechins: 27.8 wt %, the percentage of non-polymer catechingallates: 30.3 wt %, and the content of caffeine: 6.74 wt %. The "tannase-treated green tea extract" (10 g) was dissolved under stirring at 25° C. for 30 minutes in deionized water (300 g) (tannase-treated solution).

Next, a synthetic adsorbent "SP-70" (product of Mitsubishi Chemical Corporation; 36.1 mL) packed in a stainless steel column 3 (22 mm inner diameter×96 mm height, volume: 36.5 mL) was washed beforehand in a similar manner as in Example 1, and an ion-exchange resin "SK1BH" (product of Mitsubishi Chemical Corporation; 14.7 mL) packed in a glass column (16 mm inner diameter× 80 mm height, volume: 16.1 mL) was washed beforehand in a similar manner as in Example 1. The tannase-treated solution (144.4 g, 4 volumes relative to the synthetic adsorbent) obtained as described above was loaded at SV=1 ($h^1$) on the stainless steel column 3 and the outflow was discarded. The column 3 was then washed at SV=2 ($h^{-1}$) with water (36.1 mL, one volume relative to the synthetic adsorbent). Subsequent to the water-washing, a 0.1 wt % aqueous solution of sodium hydroxide (pH 12.4; 561.8 mL, 15 volumes relative to the synthetic adsorbent) was loaded at SV=5 ($h^{-1}$). The eluate was continuously loaded on the glass column to conduct deionization, so that a non-polymer catechin composition (552 g, pH 2.7) was obtained. Non-polymer catechins were contained at 0.21 wt % in the extract, the recovery rate of non-polymer catechins from the tannase-treated solution was 90.3%, and the percentage of gallates in the non-polymer catechin composition was 32.5 wt %. Further, caffeine was 0 wt %. The amount of non-polymer catechins in the solid content of the tea extract was 64.7 wt %. By reduced-pressure concentration, the non-polymer catechin composition was subjected at 40° C. and 2.6 kPa to concentration processing to a non-polymer catechin concentration of 6% (turbidity: 618 NTU), so that a "concentrated green tea extract 2" was obtained. The "concentrated green tea extract 3" was then caused to pass through a 0.8-μm cellulose acetate membrane ("ADVANTEC: C080A090C") to separate suspended matters by solid-liquid separation, so that a "purified green tea extract 3" (turbidity: 1.5 NTU) was obtained.

Comparative Example 5

The "concentrated green tea extract 1" before the clarification in Example 11.

Comparative Example 6

By a similar procedure as in Comparative Example 5 except that the amount of the ion-exchange resin was changed to ¼ and the pH value of the non-polymer catechin composition after the pH adjustment with the basic desorption solution was 9.1, a "concentrated green tea extract 3" was obtained.

TABLE 6

| | | Example 11 | Example 12 | Example 13 | Comp. Ex. 5 | Comp. Ex. 6 |
|---|---|---|---|---|---|---|
| <Analysis data of feed solution> | | | | | | |
| Content of non-polymer catechins | [wt %] | 0.98 | 0.98 | 0.89 | 0.98 | 0.98 |
| Content of caffeine | [wt %] | 0.18 | 0.18 | 0.22 | 0.18 | 0.18 |
| Percentage of non-polymer catechingallates | [wt %] | 52.2 | 52.2 | 30.3 | 52.2 | 52.2 |
| <Analysis data after elution from synthetic adsorbent(desorbing solution)> | | | | | | |
| Kind of synthetic adsorbent | | SP70 | SP70 | SP70 | SP70 | SP70 |
| pH of alkaline aqueous solution | [-] | 12.5 | 12.5 | 12.4 | 12.5 | 12.6 |
| Concentration of ethanol | [wt %] | — | — | — | — | — |
| Content of non-polymer catechins | [wt %] | 0.24 | 0.24 | 0.21 | 0.24 | 0.17 |
| Content of caffeine | [wt %] | 0 | 0 | 0 | 0 | 0 |
| Caffeine/non-polymer catechins ratio | [-] | 0 | 0 | 0 | 0 | 0 |
| Recovery rate of non-polymer catechins | [%] | 92.4 | 92.4 | 90.3 | 92.4 | 78.2 |
| pH adjustment method | | Ion exchange | Ion exchange | Ion exchange | Ion exchange | Ion exchange (amount: ¼) |
| pH after adjustment | [-] | 3.0 | 3.0 | 2.7 | 3.0 | 9.1 |
| Proportion of gallates in purified product | [wt %] | 52.9 | 52.9 | 32.5 | 52.9 | 54.2 |
| Non-polymer catechins in solid content | [wt %] | 69.2 | 69.2 | 64.7 | 69.2 | 50.2 |
| Turbidity before clarification | [NTU] | 322 | 322 | 618 | 322 | 0.55 |
| Turbidity after clarification | [NTU] | 39.5 | 1.8 | 1.5 | — | — |
| <Assessment of flavor and taste after sterilization> | Bitterness | Bitterness reduced | Bitterness reduced | Bitterness reduced | Bitter | Bitter |
| | Refreshing sensation | Felt | Felt | Felt | Not felt | Not felt |
| | Coarse taste | No abnormal taste or smell | No abnormal taste or smell | No abnormal taste or smell | No abnormal taste or smell | Some abnormal taste and smell |

TABLE 6-continued

|  |  | Example 11 | Example 12 | Example 13 | Comp. Ex. 5 | Comp. Ex. 6 |
|---|---|---|---|---|---|---|
| <Assessment of bitterness> | Quinine sulfate assessment | 7.5 | 7.5 | 5.5 | 7.8 | 7.9 |
| Stability of color tone | 450 [nm] | 1.11 | 1.08 |  | 1.21 |  |
|  | 660 [nm] | 0.05 | 0.05 |  | 0.14 |  |
|  | 670 [nm] | 0.05 | 0.04 |  | 0.13 |  |
|  | 800 [nm] | 0.02 | 0.01 |  | 0.08 |  |

Example 14

Using the "purified tea extract 2" of Example 12, the beverage described in Table 7 was prepared for packaging application. Under the Food Sanitation Act of Japan, the beverage was subjected to sterilization treatment and then to hot-pack filling so that a packaged beverage was produced.

After the thus-produced packaged beverage was stored at 37° C. for 30 days, it was assessed. It was good in external appearance and the stability of taste.

TABLE 7

| Formulation (wt %) | |
|---|---|
| Names of materials | |
| Sugar | 1.50 |
| Salt | 0.33 |
| Sweetener | 0.01 |
| VC | 0.05 |
| Fruit juice | 0.10 |
| Flavor | 0.20 |
| Catechin preparation (Example 12) | 2.11 |
| Deionized water | Balance |
| Total | 100.00 |

Before and after the treatment in each of Examples 11 to 13, the recovery rate of non-polymer catechins was high, the concentration of caffeine had been lowered, and the purified green tea extract so obtained had improved taste and stability. In Example 14, the produced beverage was good in external appearance and the stability of taste. In Comparative Example 5, the bitterness and color tone were inferior, and in Comparative Example 6, bitterness and a coarse taste remained.

(Measurement Method of Tannase Activity)

Reagent A: citrate buffer solution (pH 5.5, 50 mmol)—Citric acid (10.5 g) is dissolved in distilled water (800 mL), and the solution is adjusted to pH 5.5 with 1N NaOH solution and is diluted to 1,000 mL.

Reagent B: 0.35 wt % aqueous solution of substrate (tannic acid)—Tannic acid (175 mg) is dissolved in the citrate buffer solution (Reagent A, 50 mL).

Reagent C: 90 vol % ethanol solution.

Measuring Method:
1. The substrate solution (Reagent B, 1.0 mL) is placed in a test tube, and was maintained at 30° C. for 5 minutes.
2. A sample solution (0.25 mL) is added, and is cultured for 15 minutes at 30° C. To a blank solution, the citrate buffer solution (Reagent A) is added instead of the sample solution.
3. To the sample solution and blank solution, terminate the enzyme reaction, the ethanol solution (Reagent C, 5.0 mL each) is added to terminate the enzyme reaction.
4. Absorbance at 310 nm is measured (sample: $A_s$, blank: $A_0$).

Activity is calculated in accordance with the following calculation equations.

$$\text{Activity per volume (U/mL)} = (A_s - A_0) \times 20.3 \times 1.0 \text{ (mL)} \times 1.04 \times df/(0.71 \times 0.25 \text{ (mL)} \times 15 \text{ (min)}) = \Delta A \times 7.93 \times df$$

$$\text{Activity per weight (U/g)} = \text{(U/mL)} \times 1/C$$

20.3: µmol of tannic acid contained in 1.0 mL of the substrate solution (Reagent B) 0.71: a change in absorbance after the completion of the hydrolysis of tannic acid (20.3 µmol) under analysis conditions 1.04: conversion factor df: dilution factor C: concentration of tannase in sample (g/mL)

(Assessment of Flavor and Taste after Sterilization)

The tea extract obtained in each Example was dilute with deionized water such that the content of catechins was lowered to 0.175% [w/v]. An aliquot (40 mL) of the diluted tea extract was placed in a 50-mL pressure-resistant glass vessel. Sodium ascorbate (0.1 wt %) was added to the diluted tea extract. The solution was adjusted to pH 6.4 with a 5% aqueous solution of sodium bicarbonate, purged with nitrogen, and then subjected to thermal sterilization at 121° C. for 10 minutes in an autoclave. Subsequently, it was determined by a panel of 5 assessors as to whether or not any abnormal taste and/or smell derived from green tea was felt.

Example 15

Hot water of 90° C. (27 kg) was added to green tea leaves (Yunnan Province, China; large leaf variety; 1.8 kg). After batchwise extraction for 30 minutes under stirring, coarse filtration was conducted through a 100-mesh screen. Subsequent to a centrifugal separation operation, filtration was conducted through No. 2 filter paper to obtain a "green tea extract" (20.4 kg, pH 5.3) (the concentration of non-polymer catechins in the green tea extract=0.96 wt %, the percentage of gallates in the green tea extract=69.5 wt %, caffeine: 0.24 wt %, gallic acid=0.01 wt %).

The green tea extract was held at the temperature of 25° C., and tannase ("TANNASE KTFH", product of Kikkoman Corporation; 500 U/g) was then added to the green tea extract to give a concentration of 300 ppm. The solution was held for 85 minutes. When the percentage of gallates had dropped to 52.4 wt %, the solution was heated to 90° C., at which the solution was held for 2 minutes to inactivate the enzyme so that the reaction was terminated (pH 4.8; tannase-treated solution (1)).

Next, a synthetic adsorbent "SP-70" (product of Mitsubishi Chemical Corporation; 2,048 mL) packed in a stainless steel column 1 (110 mm inner diameter×230 mm height, volume: 2,185 mL) was washed beforehand at SV=5 (h$^{-1}$) with 95 (v/v) ethanol (8,192 mL), and then at SV=5 (h$^{-1}$)

with water (20,480 mL). An ion-exchange resin "SK1BH" (product of Mitsubishi Chemical Corporation; 852 mL) packed in a stainless steel column 2 (38 mm inner diameter× 770 mm height, volume: 873 mL) was washed beforehand at SV=5 ($h^{-1}$) with 95 (v/v) ethanol (3,408 mL), and then at SV=5 ($h^{-1}$) with water (8,520 mL). Subsequently, the tannase-treated solution (1) (8,192 g, 4 volumes relative to the synthetic adsorbent) was loaded at SV=1 ($h^{-1}$) on the column 1 and the outflow was discarded. The column 1 was then washed at SV=2 ($h^{-1}$) with water (2,048 mL, one volume relative to the synthetic adsorbent). Subsequent to the water-washing, a 0.1 wt % aqueous solution of sodium hydroxide (pH 12.5; 30,720 mL, 15 volumes relative to the synthetic adsorbent) was loaded at SV=5 ($h^{-1}$) to obtain a catechin eluate. The eluate was continuously loaded on the stainless steel column 2 to conduct deionization, so that a non-polymer catechin composition (28,222 g, pH 3.0) was obtained. Non-polymer catechins were contained at 0.24 wt % in the composition, the recovery rate of non-polymer catechins from the tannase-treated solution (1) was 92.9%, and the percentage of gallates in the non-polymer catechin composition was 55.3 wt %. Further, caffeine was 0 wt %, and the content of gallic acid was 0.001 wt %. The non-polymer catechins in the solid content of the tea extract amounted to 62.4 wt %.

Comparative Example 7

Tannase treatment was conducted as in Example 15, but the loading and elution on and from the synthetic adsorbent were not conducted.

Comparative Example 8

Treatment was conducted in exactly the same manner as in Example 15 except for the omission of the tannase treatment.

Example 16

(1) Hot water of 88° C. (45 kg) was added to green tea leaves (produce of Kenya, large leaf variety; 3 kg). After batchwise extraction for 60 minutes under stirring, coarse filtration was conducted through a 100-mesh screen. To remove fine powder from the extract, a centrifugal separation operation was then performed to obtain a "green tea extract" (37.2 kg, pH 5.4) (the concentration of non-polymer catechins in the green tea extract=0.89 wt %, the percentage of gallates in the green tea extract=52.3 wt %, caffeine: 0.17 wt %).

The green tea extract was held at the temperature of 15° C., and tannase ("TANNASE KTFH", product of Kikkoman Corporation; 500 U/g) was then added to the green tea extract to give a concentration of 430 ppm. The solution was held for 55 minutes. When the percentage of gallates had dropped to 30.5 wt %, the solution was heated to 90° C., at which the solution was held for 2 minutes to inactivate the enzyme so that the reaction was terminated (pH 5.1). Concentration processing was then performed at 70° C. and 6.7 kPa to a Brix concentration of 20% by reduced-pressure concentration. Further, the concentrate was spray-dried to obtain a powdery "tannase-treated green tea extract" (0.9 kg). The thus-obtained green tea extract had the following data—the content of non-polymer catechins: 27.8 wt %, the percentage of non-polymer catechingallates: 30.3 wt %, the content of caffeine: 6.74 wt %, and gallic acid: 3.58 wt %. The "tannase-treated green tea extract" (10 g) was dissolved under stirring at 25° C. for 30 minutes in deionized water (300 g) (tannase-treated solution (2)).

Next, a synthetic adsorbent "SP-70" (product of Mitsubishi Chemical Corporation; 36.1 mL) packed in a stainless steel column 3 (22 mm inner diameter×96 mm height, volume: 36.5 mL) was washed beforehand in a similar manner as in Example 1, and an ion-exchange resin "SK1BH" (product of Mitsubishi Chemical Corporation; 14.7 mL) packed in a glass column (16 mm inner diameter 80 mm height, volume: 16.1 mL) was washed beforehand in a similar manner as in Example 1. The tannase-treated solution (2) (144.4 g, 4 volumes relative to the synthetic adsorbent) obtained as described above was loaded at SV=1 ($h^{-1}$) on the column 1 and the outflow was discarded. The column 1 was then washed at SV=2 ($h^{-1}$) with water (36.1 mL, one volume relative to the synthetic adsorbent). Subsequent to the water-washing, a 0.1 wt % aqueous solution of sodium hydroxide (pH 12.4; 561.8 mL, 15 volumes relative to the synthetic adsorbent) was loaded at SV=5 ($h^{-1}$). The eluate was continuously loaded on the glass column to conduct deionization, so that a non-polymer catechin composition (552 g, pH 2.7) was obtained. Non-polymer catechins were contained at 0.21 wt % in the extract, the recovery rate of non-polymer catechins from the tannase-treated solution (2) was 90.3%, and the percentage of gallates in the non-polymer catechin composition was 32.5 wt %. Further, caffeine was 0 wt %, and the content of gallic acid was 0.002 wt %. The non-polymer catechins in the solid content of the tea extract amounted to 64.7 wt %.

Example 17

A crude catechin preparation (product of Mitsui Norin Co., Ltd., the concentration of non-polymer catechins=32.0 wt %, the percentage of non-polymer catechingallates=52.0 wt %, caffeine=5.51 wt %, gallic acid=0.17 wt %; 10 g) was dissolved at 25° C. for 30 minutes under stirring in deionized water (300 g) to obtain a green tea extract solution (pH5.3) Tannase ("TANNASE KTFH", product of Kikkoman Corporation; 500 U/g) was then added to the green tea extract solution to give a concentration of 500 ppm. The solution was held at 15° C. for 120 minutes. When the percentage of gallates had dropped to 4 wt %, the solution was heated to 90° C., at which the solution was held for 2 minutes to inactivate the enzyme so that the reaction was terminated (pH 4.2; tannase-treated solution (3)).

Under similar column and operation conditions as in Example 16 except that the raw material was the above-described tannase-treated solution, purification was conducted to obtain a non-polymer catechin composition (534.2 g, pH 3.7). Non-polymer catechins were contained at 0.18 wt % in the extract, the recovery rate of non-polymer catechins from the tannase-treated solution (3) was 91.3%, and the percentage of gallates in the non-polymer catechin composition was 6.0 wt %. Further, caffeine was 0 wt %, and the content of gallic acid was 0.004 wt %. The non-polymer catechins in the solid content of the tea extract amounted to 57.6 wt %.

Example 18

A synthetic adsorbent "SP-207" (product of Mitsubishi Chemical Corporation; 1,004 mL) packed in a stainless steel column 4 (60 mm inner diameter×360 mm height, volume: 1,017 mL) was washed beforehand at SV=5 ($h^{-1}$) with 95 (v/v) ethanol (4,016 mL), and then at SV=5 ($h^{-1}$) with water (10,040 mL). An ion-exchange resin "SK1BH" (product of Mitsubishi Chemical Corporation; 1, 338 mL) packed in a stainless steel column 5 (38 mm inner diameter×1,200 mm height, volume: 1,360 mL) was washed beforehand at SV=5 ($h^{-1}$) with 95 (v/v) ethanol (5,352 mL), and then at SV=5 ($h^{-1}$) with water (13,380 mL). The tannase-treated solution of Example 15 (4,016 g, 4 volumes relative to the synthetic adsorbent) was loaded at SV=1 ($h^{-1}$) on the stainless steel column 4 and the outflow was discarded. The column 4 was then washed at SV=2 ($h^{-1}$) with water (1,004 mL, one volume relative to the synthetic adsorbent). Subsequent to the water-washing, a 1 wt % aqueous solution of sodium hydroxide (pH 14.0; 5,020 mL, 5 volumes relative to the synthetic adsorbent) was loaded at SV=5 ($h^{-1}$). The eluate was continuously loaded on the stainless steel column 5 to conduct deionization, so that a non-polymer catechin composition (4,975.5 g, pH 4.1) was obtained. Non-polymer catechins were contained at 0.63 wt % in the extract, the recovery rate of non-polymer catechins from the tannase-treated solution (1) was 88.2%, and the percentage of gallates in the non-polymer catechin composition was 58.3 wt %. Further, caffeine was 0 wt %, and the content of gallic acid was 0.001 wt %. The non-polymer catechins in the solid content of the tea extract amounted to 59.3 wt %.

Example 19

An operation was conducted as in Example 16 except the packed amount of the ion-exchange resin "SK1BH" was changed to 3.6 mL. Non-polymer catechins were contained at 0.17 wt % in the thus-obtained extract, the recovery rate of non-polymer catechins from the tannase-treated solution (2) was 78.2%, and the percentage of gallates in the non-polymer catechin composition was 35.8 wt %. Further, caffeine was 0 wt %, and the content of gallic acid was 0.001 wt %. The non-polymer catechins in the solid content of the tea extract amounted to 43.3 wt %.

Comparative Example 9

A synthetic adsorbent "SP-70" (product of Mitsubishi Chemical Corporation; 860 mL) packed in a stainless steel column 4 (60 mm inner diameter×360 mm height, volume: 1,017 mL) was washed beforehand at SV=5 ($h^{-1}$) with 95 (v/v) ethanol (3,440 mL), and then at SV=5 ($h^{-1}$) with water (8,600 mL). The tannase-treated solution of Example 15 (3,440 g, 4 volumes relative to the synthetic adsorbent) was loaded at SV=1 ($h^{-1}$) on the stainless steel column 4 and the outflow was discarded.

The column 4 was then washed at SV=2 ($h^{-1}$) with water (860 mL, one volume relative to the synthetic adsorbent). Subsequent to the water-washing, a 20 wt % aqueous solution of ethanol (5,160 mL, 6 volumes relative to the synthetic adsorbent) was loaded at SV=2 ($h^{-1}$). Ethanol was distilled off at 40° C. and 2.7 kpa, and then, the water content was adjusted. In the thus-obtained extract, non-polymer catechins were contained at 0.50 wt %. The recovery rate of non-polymer catechins from the tannase-treated solution (1) was 84.4%, and the percentage of gallates in the non-polymer catechin composition was 45.9 wt %. Further, caffeine was 0.1 wt %, and the content of gallic acid was 0.008 wt %. The non-polymer catechins in the solid content of the tea extract amounted to 60.8 wt %.

Comparative Example 10

Acid clay ("MIZUKA ACE #600, product of Mizusawa Chemical Industries, Ltd.; 100 g) was dispersed at the stirring conditions of room temperature and 350 r/min in a 92.4 wt % aqueous solution of ethanol (800 g). After stirring was conducted for approximately 10 minutes, the tannase-treated green tea extract (200 g) obtained in Example 16 was poured, and still at room temperature, stirring was continued for approximately 3 hours (pH 4.0). Subsequently, the formed precipitate and acid clay were filtered off by No. 2 filter paper. The thus-obtained filtrate was brought into contact with activated carbon ("KURARAY COAL GLC", product of Kuraray Chemical Co., Ltd.; 30 g), and without a break, was filtered through a 0.2-μm membrane filter. Finally, deionized water (200 g) was added, ethanol was distilled off at 40° C. and 2.7 kPa, and then, the water content was adjusted to obtain a "purified green tea extract". In the thus-obtained extract, non-polymer catechins were contained at 20.2 wt %. The recovery rate of non-polymer catechins from the tannase-treated solution of Example 16 was 60.5%, and the percentage of gallates in the non-polymer catechin composition was 29.3 wt %. Further, caffeine was 0.73 wt %, and the content of gallic acid was 2.56 wt %. The non-polymer catechins in the solid content of the tea extract amounted to 56.6 wt %.

The tea extracts described in Examples 15 to 19 and Comparative Examples 7 to 10 were subjected to sterilization treatment under the Food Sanitation Act of Japan, were then assessed for flavor/taste and bitterness. The results are shown in Table 8.

After the treatment in each of Examples 15 to 19, the recovery rate of non-polymer catechins was high, the concentration of caffeine had been lowered, and the tea extract so obtained was substantially free of gallic acid and was low in the concentration of caffeine. In Example 20, the produced beverage was good in external appearance and the stability of taste. In Comparative Example 7, a sour taste and coarse taste remained, and in Comparative Example 8, bitterness remained. In Comparative Example 9, the content of caffeine was high, and in Comparative Example 10, a sour taste remained.

TABLE 8

|  |  | Example 15 | Example 16 | Example 17 | Example 18 | Example 19 |
| --- | --- | --- | --- | --- | --- | --- |
| Tannase treatment |  | Treated | Treated | Treated | Treated | Treated |
|  | <After tannase treatment/analysis data of extract> | | | | | |
| Content of non-polymer catechins | [wt %] | 0.89 | 0.89 | 0.73 | 0.89 | 0.89 |
| Content of caffeine | [wt %] | 0.20 | 0.22 | 0.16 | 0.20 | 0.22 |
| Content of gallic acid | [wt %] | 0.10 | 0.12 | 0.22 | 0.10 | 0.12 |
| Percentage of non-polymer catechingallates | [wt %] | 52.4 | 30.3 | 4.28 | 52.4 | 30.3 |
| Percent reduction of gallates | [wt %] | 17.1 | 22.0 | 47.7 | 17.1 | 22.0 |

TABLE 8-continued

<Analysis data after elution from synthetic adsorbent(desorbing solution)>

| | | SP70 | SP70 | SP70 | SP207 | SP70 |
|---|---|---|---|---|---|---|
| Use/nonuse of synthetic adsorbent, kind | | SP70 | SP70 | SP70 | SP207 | SP70 |
| pH of alkaline aqueous solution | [-] | 12.5 | 12.4 | 12.5 | 14.0 | 12.6 |
| Concentration of ethanol | [wt %] | 0 | 0 | 0 | 0 | 0 |
| Content of non-polymer catechins | [wt %] | 0.24 | 0.21 | 0.18 | 0.63 | 0.17 |
| Content of caffeine | [wt %] | 0 | 0 | 0 | 0 | 0 |
| Content of gallic acid | [wt %] | 0.001 | 0.002 | 0.004 | 0.001 | 0.001 |
| Caffeine/non-polymer catechins ratio | [-] | 0 | 0 | 0 | 0 | 0 |
| Gallic acid/non-polymer catechins ratio | [-] | 0.004 | 0.009 | 0.022 | 0.002 | 0.006 |
| Recovery rate of non-polymer catechins | [%] | 92.9 | 90.3 | 91.3 | 88.2 | 78.2 |
| pH adjustment method | | Ion exchange | Ion exchange | Ion exchange | Ion exchange | Ion exchange (amount: ¼) |
| pH after adjustment | [-] | 3.0 | 2.7 | 3.7 | 4.1 | 8.6 |
| Proportion of gallates in purified product | [wt %] | 55.3 | 32.5 | 6.0 | 58.3 | 35.8 |
| Non-polymer catechins in solid content | [wt %] | 62.4 | 64.7 | 57.6 | 59.3 | 43.3 |
| <Assessment of flavor and taste after sterilization> | Bitterness | Slight | Very slight | None | Slight | Very slight |
| | Sour taste | None | None | None | None | None |
| | Coarse taste | No abnormal taste or smell | No abnormal taste or smell | No abnormal taste or smell | No abnormal taste or smell | Slight coarse taste |
| <Assessment of bitterness> | Quinine sulfate assessment | 6.8 | 5.5 | 5.0 | 6.7 | 5.8 |
| Loading ratio (amount of solution/volume of resin) | [BV] | 15 | 15 | 15 | 5 | 15 |

| | | Comp. Ex. 7 | Comp. Ex. 8 | Comp. Ex. 9 | Comp. Ex. 10 |
|---|---|---|---|---|---|
| Tannase treatment | | Treated | Not treated | Treated | Treated |
| <After tannase treatment/analysis data of extract> | | | | | |
| Content of non-polymer catechins | [wt %] | 0.89 | 0.96 | 0.89 | 27.8 |
| Content of caffeine | [wt %] | 0.20 | 0.24 | 0.20 | 6.74 |
| Content of gallic acid | [wt %] | 0.10 | 0.01 | 0.10 | 3.58 |
| Percentage of non-polymer catechingallates | [wt %] | 52.4 | 69.5 | 52.4 | 30.3 |
| Percent reduction of gallates | [wt %] | 17.1 | 0 | 17.1 | 22.0 |
| <Analysis data after elution from synthetic adsorbent (desorbing solution)> | | | | | |
| Use/nonuse of synthetic adsorbent, kind | | Not used | SP70 | SP70 | Not used |
| pH of alkaline aqueous solution | [-] | — | 12.5 | — | — |
| Concentration of ethanol | [wt %] | — | 0 | 20 | 92 |
| Content of non-polymer catechins | [wt %] | — | 0.22 | 0.50 | 20.2 |
| Content of caffeine | [wt %] | — | 0 | 0.10 | 0.73 |
| Content of gallic acid | [wt %] | — | 0.001 | 0.008 | 2.56 |
| Caffeine/non-polymer catechins ratio | [-] | — | 0 | 0.191 | 0.036 |
| Gallic acid/non-polymer catechins ratio | [-] | — | 0.005 | 0.016 | 0.127 |
| Recovery rate of non-polymer catechins | [%] | — | 93.0 | 84.4 | 60.5 |
| pH adjustment method | | — | Ion exchange | — | — |
| pH after adjustment | [-] | — | 3.5 | 4.0 | 3.3 |
| Proportion of gallates in purified product | [wt %] | 52.4 | 72.1 | 45.9 | 29.3 |
| Non-polymer catechins in solid content | [wt %] | 32.3 | 69.2 | 60.8 | 56.6 |
| <Assessment of flavor and taste after sterilization> | Bitterness | Slight | Bitter | Slight | Slight |
| | Sour taste | Sour | None | None | Sour |
| | Coarse taste | Coarse taste | Coarse taste | No abnormal taste or smell | No abnormal taste or smell |
| <Assessment of bitterness> | Quinine sulfate assessment | 8.0 | 7.8 | 6.8 | 6.3 |
| Loading ratio (amount of solution/volume of resin) | [BV] | — | 15 | 6 | — |

Example 20

Using the purified green tea extract of Example 17, the beverage described in Table 9 was prepared for packaging application. Under the Food Sanitation Act of Japan, the beverage was subjected to sterilization treatment and then to hot-pack filling so that a packaged beverage was produced.

After the thus-produced packaged beverage was stored at 37° C. for 30 days, it was assessed. It was good in external appearance and the stability of taste.

TABLE 9

| Names of materials | Added amounts (%) |
|---|---|
| Sugar | 1.50 |
| Salt | 0.33 |
| Sweetener | 0.01 |
| VC | 0.05 |
| Fruit juice | 0.10 |
| Flavor | 0.20 |

TABLE 9-continued

| Names of materials | Added amounts (%) |
|---|---|
| Purified green tea extract (Example 17) | 70.83 |
| Deionized water | Balance |
| Total | 100.00 |

Example 21

A crude catechin preparation (product of Mitsui Norin Co., Ltd., the concentration of non-polymer catechins=32.0 wt %, the percentage of non-polymer non-gallate catechins=47.8 wt %, caffeine=5.88 wt %; 150 g) was dissolved at 25° C. for 30 minutes under stirring in deionized water (4,500 g) to obtain a tea extract (pH5.3). Next, a synthetic adsorbent "SP-207" (product of Mitsubishi Chemical Corporation; 861 mL) packed in a stainless steel column 1 (60 mm inner diameter×360 mm height, volume: 1,017.4 mL) was washed beforehand at SV=5 ($h^{-1}$) with 95 (v/v) ethanol (3,444 mL), and then at SV=5 ($h^{-1}$) with water (8,610 mL). An ion-exchange resin "SK1BH" (product of Mitsubishi Chemical Corporation; 350.6 mL) packed in a stainless steel column 2 (38 mm inner diameter×340 mm height, volume: 385.4 mL) was washed beforehand at SV=5 ($h^{-1}$) with 95 (v/v) ethanol (1402.4 mL), and then at SV=5 ($h^{-1}$) with water (3,506 mL). Subsequently, the tea extract (3,435 g, 4 volumes relative to the synthetic adsorbent) was loaded at SV=1 ($h^{-1}$) on the stainless steel column 1 and the outflow was discarded. The column 1 was then washed at SV=2 ($h^{-1}$) with water (861 mL, one volume relative to the synthetic adsorbent). Subsequent to the water-washing, a 0.01 wt % aqueous solution of sodium hydroxide (pH 11.5; 12,900 mL, 15 volumes relative to the synthetic adsorbent) was loaded as an eluent at SV=5 ($h^{-1}$) to obtain a fraction. The fraction was continuously loaded on the stainless steel column 2 to conduct deionization, so that a purified tea extract (12,860 g, pH 3.5) was obtained. The non-polymer catechins in the purified tea extract amounted to 31.0% when the adsorbed non-polymer catechins were assumed to be 100.

Example 22

An operation was conducted as in Example 21 except that a 20 wt % aqueous solution of ethanol (860 mL, one volume relative to the synthetic adsorbent) was loaded as an eluent at SV=2 ($h^{-1}$) and the fraction was not deionized. The non-polymer catechins in the purified tea extract amounted to 41.0% when the adsorbed non-polymer catechins were assumed to be 100.

Comparative Example 11

An operation was conducted as in Example 21 except that a 0.1 wt % aqueous solution of sodium hydroxide (12,900 mL, 15 volumes relative to the synthetic adsorbent) was loaded as an eluent at SV=5 ($h^{-1}$). The non-polymer catechins in the purified tea extract amounted to 92.4% when the adsorbed non-polymer catechins were assumed to be 100.

Comparative Example 12

An operation was conducted as in Example 22 except that a 20 wt % aqueous solution of ethanol (5,170 mL, 6 volumes relative to the synthetic adsorbent) was loaded as an eluent at SV=2 ($h^{-1}$). The non-polymer catechins in the purified tea extract amounted to 85.0% when the adsorbed non-polymer catechins were assumed to be 100.

The results of Examples 21 and 22 and Comparative Examples 11 and 12 are shown in Table 10.

TABLE 10

|  |  | Raw material (tea extract before adsorption) | Example 21 | Example 22 | Comp. Ex. 11 | Comp. Ex. 12 |
|---|---|---|---|---|---|---|
| Eluent |  |  | Basic aq. soln. | Aq. soln. of organic solvent | Basic aq. soln. | Aq. soln. of organic solvent |
| Concentration of basic aqueous solution | [wt %] |  | 0.01 | — | 0.1 | — |
| Concentration of organic solvent | [wt %] |  | — | 20 | — | 20 |
| Loading ratio of eluent | [BV] |  | 15 | 1 | 15 | 6 |
| Recovery rate of non-polymer catechins | [%] |  | 31.0 | 41.0 | 92.4 | 85.0 |
| Non-polymer catechins | [wt %] | 0.91 | 0.09 | 1.74 | 0.24 | 0.63 |
| Caffeine | [wt %] | 0.17 | 0.00 | 0.00 | 0.00 | 0.04 |
| Gallic acid | [wt %] | 0.006 | 0.000 | 0.000 | 0.001 | 0.000 |
| Caffeine/non-polymer catechins ratio | [-] | 0.18 | 0.00 | 0.00 | 0.00 | 0.06 |
| Gallic acid/non-polymer catechins ratio | [-] | 0.007 | 0.000 | 0.000 | 0.005 | 0.000 |
| Percentages of respective components in non-polymer catechins |  |  |  |  |  |  |
| GC | [wt %] | 6.4 | 10.2 | 13.3 | 5.5 | 7.0 |
| EGC | [wt %] | 30.9 | 47.2 | 57.3 | 30.6 | 35.8 |
| C | [wt %] | 3.2 | 5.9 | 1.8 | 3.4 | 2.1 |
| EC | [wt %] | 7.6 | 9.4 | 3.9 | 7.6 | 8.2 |
| EGCg | [wt %] | 38.8 | 25.1 | 22.5 | 39.3 | 40.9 |
| GCg | [wt %] | 2.1 | 1.1 | 0.7 | 2.2 | 1.9 |
| ECg | [wt %] | 9.9 | 0.9 | 0.5 | 10.2 | 3.9 |
| Cg | [wt %] | 1.3 | 0.1 | 0.0 | 1.3 | 0.2 |
| Percentage of non-gallates in non-polymer catechins | [wt %] | 48.0 | 72.7 | 76.2 | 47.1 | 53.2 |
| Percentage of gallocatechins | [wt %] | 78.1 | 83.7 | 93.7 | 77.5 | 85.6 |
| Percentage of epicatechins | [wt %] | 87.1 | 82.6 | 84.2 | 87.6 | 88.8 |

TABLE 10-continued

|  |  | Raw material (tea extract before adsorption) | Example 21 | Example 22 | Comp. Ex. 11 | Comp. Ex. 12 |
|---|---|---|---|---|---|---|
| Ratio of non-gallates to raw material | [—] | — | 1.51 | 1.59 | 0.98 | 1.11 |
| Ratio of gallocatechins to raw material | [—] | — | 1.07 | 1.20 | 0.99 | 1.10 |
| Ratio of epicatechins to raw material | [—] | — | 0.95 | 0.97 | 1.01 | 1.02 |
| Assessment of flavor and taste |  |  |  |  |  |  |
| Tea flavor |  | Felt | Not felt | Not felt | Not felt | Not felt |
| Bitterness |  | 8 | 6 | 6 | 8 | 8 |

As evident from Table 10, a purified tea extract having a lowered caffeine content, a high percentage of non-polymer non-gallate catechins, a reduced tea flavor and taste, reduced bitterness and an improved flavor and taste can be obtained by adsorbing a tea extract on a synthetic adsorbent, bringing a washing solution into contact with the synthetic adsorbent, and then bringing an eluent into contact with the synthetic adsorbent to fractionate, as fractionation conditions, from 10 to 60% of non-polymer catechins adsorbed on the synthetic adsorbent. The extract is, therefore, useful not only as a tea-based beverage but also as a non-tea-based beverage.

The invention claimed is:

1. A process for producing a purified tea extract, comprising adsorbing a tea extract on a synthetic adsorbent, washing the synthetic adsorbent with a basic aqueous solution or ethanol at a solvent concentration of from 0 to 5 wt %, contacting the synthetic adsorbent with ethanol at a solvent concentration of from 10 to 80 wt % to elute non-polymer catechins, and then bringing the eluate into contact with activated carbon in ethanol, wherein the synthetic adsorbent is an acrylic resin, methacrylic resin, polyvinyl resin or styrene resin.

2. A process for producing a purified tea extract, comprising adsorbing a tea extract on a synthetic adsorbent, eluting said tea extract with a basic aqueous solution by contacting the synthetic adsorbent with said basic aqueous solution to elute non-polymer catechins, adjusting the pH of the eluate to 7 or lower, concentrating the eluate, and then subjecting the eluate to solid-liquid separation to remove precipitated and suspended matters, wherein the synthetic adsorbent is an acrylic resin, methacrylic resin, polyvinyl resin or styrene resin.

3. A process for producing a purified tea extract, comprising adsorbing a tea extract on a synthetic adsorbent, washing the synthetic adsorbent with ethanol at a solvent concentration of from 0 to 5 wt %, and then contacting the synthetic adsorbent with a basic aqueous solution or ethanol at a solvent concentration of from 10 to 80 wt % to fractionate a tea extract having a percentage of non-gallates as non-polymer catechins in a range of from 55 to 100 wt % and a caffeine/non-polymer catechins of from 0 to 0.15, wherein the synthetic adsorbent is an acrylic resin, methacrylic resin, polyvinyl resin or styrene resin.

4. The process according to claim 1, wherein the tea extract undergoes a hydrolysis treatment.

5. The process according to claim 1, wherein subsequent to completion of the adsorption step, the synthetic adsorbent is washed, and the basic aqueous solution or ethanol is then brought into contact with the synthetic adsorbent.

6. The process according to claim 1, wherein the synthetic adsorbent is contacted with ethanol.

7. The process according to claim 1, wherein the resulting purified tea extract comprises from 25 to 90 wt % of non-polymer catechins based on its solid content.

8. The process according to claim 1, wherein the resulting purified tea extract comprises from 25 to 90 wt % of non-polymer catechins based on its solid content, and has a ratio of caffeine to non-polymer catechins in a range of from 0 to 0.15.

9. The process according to claim 1, wherein the resulting purified tea extract comprises from 25 to 90 wt % of non-polymer catechins based on its solid content, a ratio of caffeine to said non-polymer catechins is from 0 to 0.15, a percentage of gallates in said non-polymer catechins is from 0 to 70 wt %, and a ratio of gallic acid to the non-polymer catechins is from 0 to 0.1.

10. The process according to claim 4, wherein the hydrolysis treatment is treatment with an enzyme, cells or culture having tannase activity.

11. The process according to claim 2, wherein the tea extract undergoes a hydrolysis treatment.

12. The process according to claim 11, wherein the hydrolysis treatment is treatment with an enzyme, cells or culture having tannase activity.

* * * * *